(12) United States Patent
Burnett

(10) Patent No.: US 12,007,066 B2
(45) Date of Patent: Jun. 11, 2024

(54) ASSEMBLY FOR SUPPORTING AN ARTICLE AND METHODOLOGY FOR ASSEMBLING THE SAME

(71) Applicant: Sauder Woodworking Co., Archbold, OH (US)

(72) Inventor: Marvin K. Burnett, Archbold, OH (US)

(73) Assignee: SAUDER WOODWORKING CO., Archbold, OH (US)

( * ) Notice: Subject to any disclaimer, the term of this patent is extended or adjusted under 35 U.S.C. 154(b) by 52 days.

(21) Appl. No.: 17/570,797

(22) Filed: Jan. 7, 2022

(65) Prior Publication Data

US 2023/0220950 A1 Jul. 13, 2023

(51) Int. Cl.
 *F16M 11/22* (2006.01)
 *F16M 11/04* (2006.01)
(52) U.S. Cl.
 CPC ............. *F16M 11/22* (2013.01); *F16M 11/04* (2013.01); *F16M 2200/08* (2013.01)
(58) Field of Classification Search
 CPC .... F16M 11/04; F16M 11/22; F16M 2200/08; A47B 13/04; A47B 96/202; A47B 91/00; E04C 3/125; E04C 3/127
 See application file for complete search history.

(56) References Cited

U.S. PATENT DOCUMENTS

| | | | |
|---|---|---|---|
| 705,653 A * | 7/1902 | Davis | A47B 91/00 248/188.8 |
| 1,886,112 A | 11/1932 | Luarde | |
| 2,144,318 A | 1/1939 | Kryder | |
| 2,149,882 A | 3/1939 | Clements | |
| 2,281,959 A | 5/1942 | Stone | |
| 2,544,504 A | 3/1951 | Keys | |
| 2,598,105 A * | 5/1952 | Bolling | A47C 19/005 5/310 |
| 2,768,043 A | 10/1956 | Kristoff et al. | |
| 2,784,930 A | 3/1957 | Wernecke | |
| 2,823,392 A | 2/1958 | Barry | |

(Continued)

FOREIGN PATENT DOCUMENTS

| CA | 2367533 A1 | 7/2002 |
|---|---|---|
| CA | 2991463 A1 | 7/2018 |

(Continued)

OTHER PUBLICATIONS

Sauder Item #401281 documentation, including: instruction book dated Jun. 16, 2006; part drawings dated Nov. 21 and 24, 2005; and miter-fold specification dated Jan. 18, 2006, 51 pages.

(Continued)

*Primary Examiner* — Eret C McNichols
(74) *Attorney, Agent, or Firm* — Honigman LLP; Douglas H. Siegel; Jonathan P. O'Brien

(57) ABSTRACT

An assembly for supporting an article is disclosed. The assembly may include one or a combination of a pillar member, a first cap member, a second cap member; and a fastener. In some configurations, the pillar member may be utilized alone for supporting the article; as such the first cap member, the second cap member, and the fastener may be individually or collectively optional. A method for assembling the assembly is also disclosed.

28 Claims, 14 Drawing Sheets

(56) References Cited

U.S. PATENT DOCUMENTS

| | | | | |
|---|---|---|---|---|
| 2,828,490 | A * | 4/1958 | Barry | A47B 91/00 5/310 |
| 2,842,417 | A * | 7/1958 | Scanlon | A47B 91/00 248/188.8 |
| 2,879,086 | A | 3/1959 | Perry | |
| 2,905,422 | A | 9/1959 | Sacharow | |
| 2,993,603 | A | 7/1961 | Fohn | |
| 3,005,612 | A * | 10/1961 | Drezner | F16B 12/48 248/188 |
| 3,175,794 | A | 3/1965 | Beene, III | |
| 3,179,365 | A | 4/1965 | Holtz | |
| 3,638,803 | A | 2/1972 | MacMillan | |
| 3,648,626 | A | 3/1972 | Schuster | |
| 3,649,398 | A | 3/1972 | Keith | |
| 3,675,808 | A | 7/1972 | Brink | |
| 3,697,147 | A | 10/1972 | Schulte | |
| 3,698,150 | A * | 10/1972 | Anderson | A47B 91/00 249/188 |
| 3,698,329 | A | 10/1972 | Diamond et al. | |
| 3,729,244 | A | 4/1973 | Butler | |
| 3,863,575 | A | 2/1975 | Kuns et al. | |
| 3,863,832 | A | 2/1975 | Gordon et al. | |
| 3,881,794 | A | 5/1975 | Henning | |
| 3,952,672 | A | 4/1976 | Gordon et al. | |
| 4,042,199 | A | 8/1977 | Winkler | |
| 4,099,472 | A | 7/1978 | Kellogg | |
| 4,325,597 | A | 4/1982 | Morrison | |
| 4,402,170 | A | 9/1983 | Seidner | |
| 4,456,212 | A | 6/1984 | Raftery | |
| 4,709,642 | A | 12/1987 | Briosi | |
| 4,746,088 | A * | 5/1988 | Kruger | A47B 91/00 248/188.8 |
| 4,759,295 | A | 7/1988 | Nilsen | |
| 4,792,325 | A | 12/1988 | Schmidtke | |
| 4,867,074 | A | 9/1989 | Quasnick | |
| 4,930,643 | A | 6/1990 | Flum | |
| 5,100,090 | A | 3/1992 | Drower | |
| 5,176,090 | A | 1/1993 | Roberts et al. | |
| 5,195,440 | A | 3/1993 | Gottlieb | |
| 5,272,989 | A | 12/1993 | Johnston et al. | |
| 5,339,746 | A | 8/1994 | Vannatta | |
| 5,377,600 | A | 1/1995 | Speese et al. | |
| 5,411,153 | A | 5/1995 | Unfried | |
| 5,413,834 | A | 5/1995 | Hunter et al. | |
| 5,441,154 | A | 8/1995 | Youell, III | |
| 5,480,689 | A | 1/1996 | Shepard et al. | |
| 5,562,048 | A | 10/1996 | Gottlieb | |
| 5,682,936 | A | 11/1997 | Higdon, Jr. | |
| 5,735,221 | A | 4/1998 | Benayon | |
| 5,791,612 | A | 8/1998 | King | |
| 5,809,903 | A | 9/1998 | Young, Jr. | |
| 5,921,187 | A | 7/1999 | Wang | |
| 5,950,546 | A | 9/1999 | Brown et al. | |
| 5,996,510 | A | 12/1999 | Harpman et al. | |
| 6,050,428 | A | 4/2000 | Hollander | |
| 6,135,033 | A | 10/2000 | Deferrari | |
| 6,520,353 | B2 | 2/2003 | Fulbright | |
| 7,028,964 | B2 | 4/2006 | Baechle | |
| 7,086,436 | B2 * | 8/2006 | Gottlieb | E04C 3/127 144/368 |
| 7,223,317 | B2 | 5/2007 | Newberry et al. | |
| 7,325,500 | B2 | 2/2008 | Carpenter et al. | |
| 7,604,307 | B2 | 10/2009 | Greenwald et al. | |
| 7,744,160 | B2 * | 6/2010 | Stolarov | A47B 47/0008 297/440.14 |
| 7,891,507 | B2 | 2/2011 | Shetler | |
| 8,596,593 | B2 | 12/2013 | Saffell et al. | |
| 8,794,576 | B2 * | 8/2014 | Tsai | A47B 13/02 248/188.8 |
| 8,857,351 | B2 | 10/2014 | Zimmer et al. | |
| 9,185,984 | B2 * | 11/2015 | Henke | B32B 1/08 |
| 10,034,543 | B1 * | 7/2018 | Burnett | A47B 96/206 |
| 10,201,226 | B2 * | 2/2019 | Burnett | A47F 5/112 |
| 10,617,204 | B2 | 4/2020 | Burnett et al. | |
| 2006/0165248 | A1 * | 7/2006 | Butcher | H04R 1/021 381/345 |
| 2007/0151180 | A1 | 7/2007 | Pace et al. | |
| 2007/0176525 | A1 | 8/2007 | Yoon | |
| 2010/0019021 | A1 | 1/2010 | Dixon-Garrett et al. | |
| 2010/0122867 | A1 * | 5/2010 | Butcher | H04R 1/021 181/199 |
| 2014/0291262 | A1 | 10/2014 | Choe et al. | |
| 2015/0305521 | A1 | 10/2015 | Volz et al. | |
| 2016/0088941 | A1 | 3/2016 | Snowbarger | |
| 2016/0198870 | A1 | 7/2016 | Volz et al. | |
| 2019/0150611 | A1 | 5/2019 | Burnett | |
| 2020/0146444 | A1 | 5/2020 | Burnett et al. | |

FOREIGN PATENT DOCUMENTS

| | | |
|---|---|---|
| CA | 3123648 A1 | 7/2018 |
| CA | 3123659 A1 | 7/2018 |
| CA | 3070337 A1 | 7/2020 |
| DE | 102005045455 A1 | 4/2007 |
| DE | 202010009518 U1 | 2/2011 |
| GB | 2141924 A | 1/1985 |

OTHER PUBLICATIONS

Photos of birdhouse, publicly available prior to Jan. 17, 2016, 3 pages.

Mainstays Parsons End Table, believed to be publicly available before Jan. 17, 2017, 4 pages.

Response to Office Action dated Jan. 8, 2018 for U.S. Appl. No. 15/407,921.

Response to Final Office Action dated Mar. 7, 2018 for U.S. Appl. No. 15/407,921.

Response to Office Action dated Jun. 1, 2018 for U.S. Appl. No. 15/657,390.

* cited by examiner

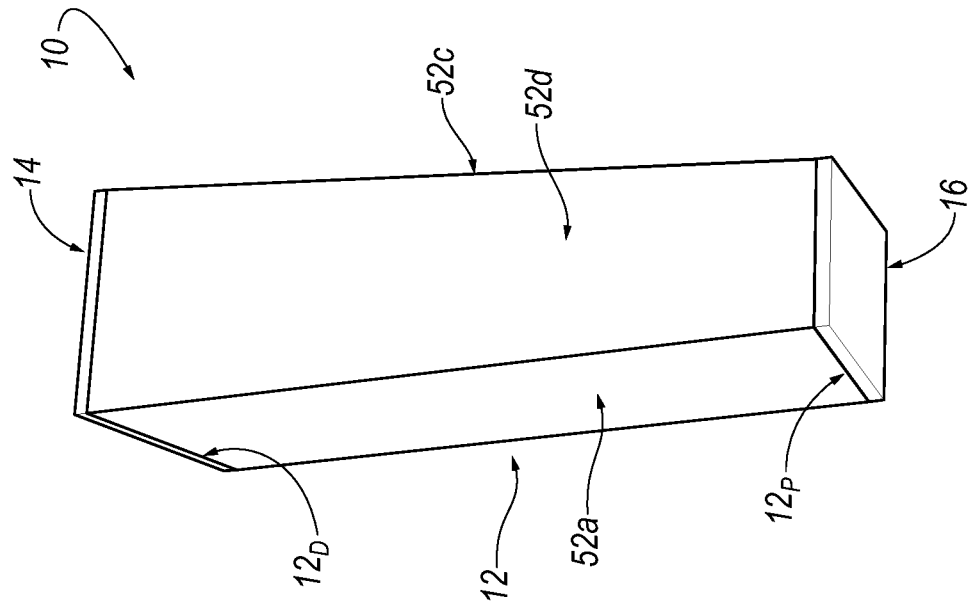
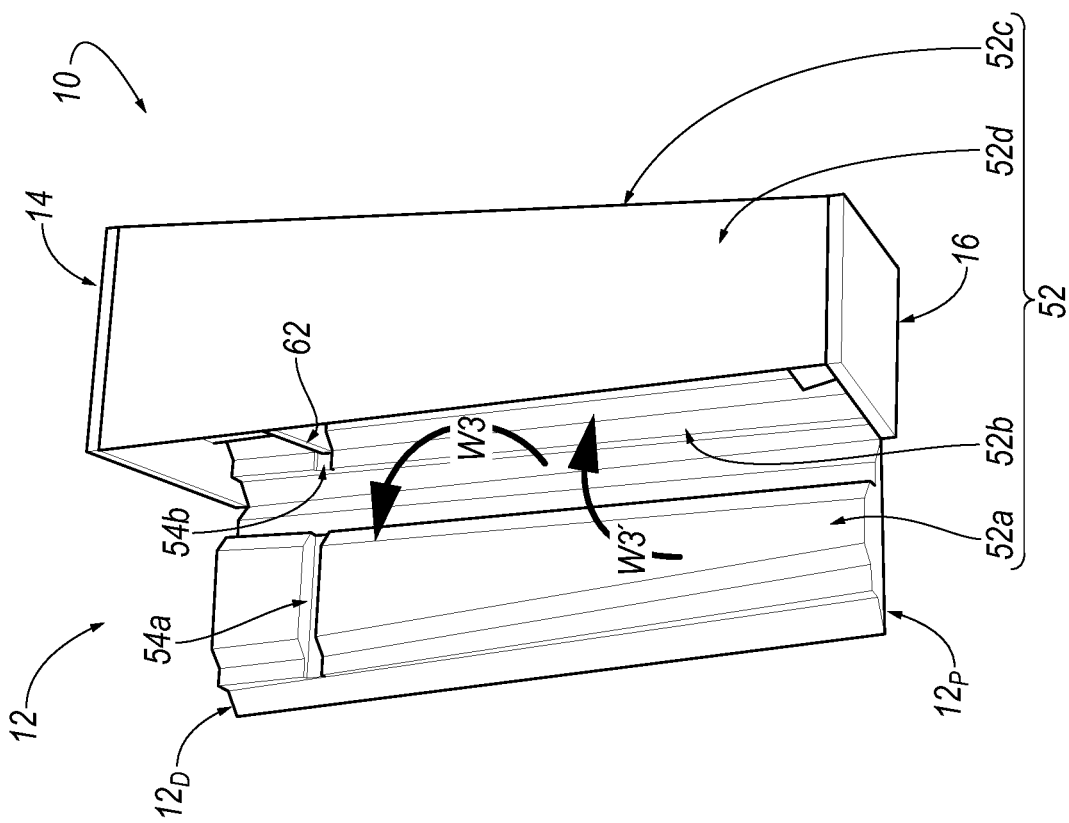

ASSEMBLY FOR SUPPORTING AN ARTICLE AND METHODOLOGY FOR ASSEMBLING THE SAME

TECHNICAL FIELD

The disclosure relates generally to an assembly for supporting an article and a methodology for assembling the same.

BACKGROUND

This section provides background information related to the present disclosure and is not necessarily prior art.

While known assemblies for support articles have proven to be acceptable for various applications, such assemblies are nevertheless susceptible to improvements that may enhance their overall performance and cost. Therefore, a need exists to develop assemblies that advance the art.

SUMMARY

This section provides a general summary of the disclosure, and is not a comprehensive disclosure of its full scope or all of its features.

One aspect of the disclosure provides an assembly including a pillar member and a cap member. The pillar member includes a distal end and a proximal end. The cap member axially extending away from the distal end of the pillar member. The pillar member includes a plurality of wall segments. At least one pair of wall segments of the plurality of wall segments are connected by a living hinge. The plurality of wall segments form a cavity that is configured to: axially receive a first portion of the cap member; and radially receive a second portion of the cap member for non-removably connecting the cap member to the pillar member.

Implementations of the disclosure may include one or more of the following optional features. The assembly also further includes a fastener that extends away from a distal surface of the cap member. A fastener-receiving passage extends through the cap member and is accessible by a distal opening formed by the distal surface of the cap member. The fastener is disposed within the fastener-receiving passage such that a distal length portion of a length of the fastener extends beyond the distal surface of the cap member. The fastener also includes a head portion and a stem portion extending from the head portion. The head portion is disposed within a head-receiving portion of the fastener-receiving passage. The stem portion is disposed within a stem-receiving portion of the fastener-receiving passage.

In some implementations, the assembly also includes a closure member non-removably connected to the proximal end of the pillar member. A portion of the closure member is configured for axial arrangement within a portion of the cavity that extends from the proximal end of the pillar member. The portion of the closure member is defined by a closure member width dimension that increases along an axial length of the portion of the closure member as the portion of the closure member axially extends from the proximal end of the pillar member toward the distal end of the pillar member. The cavity is defined by a cavity width dimension that decreases along an axial length of the pillar member as the cavity axially extends from the distal end of the pillar member toward the proximal end of the pillar member.

In some examples, each wall segment of the plurality of wall segments includes a radially-extending channel that is sized for receiving the second portion of the cap member for non-removably connecting the cap member to the pillar member. The second portion of the cap member includes a flange that radially extends from the first portion of the cap member. The cap member further includes a lip portion that extends over and is arranged upon the distal end of the pillar member.

In other examples, each wall segment of the plurality of wall segments is defined by: a length dimension extending between a first end of the body and a second end of the body that is opposite the first end of the body; and a width dimension extending between a first edge of the body and a second edge of the body that is opposite the first edge of the body. The width dimension of the body of each wall segment of the plurality of wall segments decreases along the length of the body as the body extends from the first end of the body to the second end of the body. A body of each wall segment of the plurality of wall segments includes a male portion and a female portion. The male portion of one wall segment is arranged within the female portion of another wall segment. The body of each wall segment of the plurality of wall segments is defined by: an outer show surface; and an inner surface. The inner surface at least partially defines the cavity.

In some instances, the inner surface includes a first segment of the width dimension of the body of each wall segment of the plurality of wall segments, a second segment of the width dimension of the body of each wall segment of the plurality of wall segments, and a third segment of the width dimension of the body of each wall segment of the plurality of wall segments. The first segment of the width dimension includes the male portion. The second segment of the width dimension includes the female portion. The third segment of the width dimension of the body extends between and connects the first segment of the width dimension of the body to the second segment of the width dimension of the body. The third segment of the width dimension of the body at least partially defines the cavity of the pillar member.

Another aspect of the disclosure provides an assembly including a pillar member and a closure member. The pillar member includes a distal end and a proximal end. The pillar member includes a plurality of wall segments. At least one pair of wall segments of the plurality of wall segments are connected by a living hinge. The plurality of wall segments define a cavity extending through an axial length of pillar member. The closure member includes a pillar-engaging portion that is configured for non-removable-coupling of the closure member to the pillar member. The closure member includes a closure member width dimension of the pillar-engaging portion of the closure member that increases along an axial length of the pillar-engaging portion of the closure member as the pillar-engaging portion of the closure member axially extends from the proximal end of the pillar member toward the distal end of the pillar member. The cavity includes a cavity width dimension that decreases along the axial length of pillar member as the cavity axially extends from the distal end of the pillar member toward the proximal end of the pillar member.

Implementations of the disclosure may include one or more of the following optional features. The assembly also further includes a cap member axially extending away from the distal end of the pillar member. The cavity is configured to: axially receive a first portion of the cap member; and radially receive a second portion of the cap member for non-removably-connecting the cap member to the pillar member.

In some implementations, the assembly also includes a fastener that extends away from a distal surface of the cap member. A fastener-receiving passage extends through the cap member and is accessible by a distal opening formed by the distal surface of the cap member. The fastener is disposed within the fastener-receiving passage such that a distal length portion of a length of the fastener extends beyond the distal surface of the cap member. The fastener also includes a head portion and a stem portion extending from the stem portion. The head portion is disposed within a head-receiving portion of the fastener-receiving passage. The stem portion is disposed within a stem-receiving portion of the fastener-receiving passage.

In some examples, each wall segment of the plurality of wall segments includes a radially-extending channel that is sized for receiving the second portion of the cap member for non-removably connecting the cap member to the pillar member. The second portion of the cap member includes a flange that radially extends from the first portion of the cap member. The first portion of the cap member is a base portion of the cap member. The cap member further includes a lip portion that extends over and is arranged upon the distal end of the pillar member.

In other examples, each wall segment of the plurality of wall segments is defined by a length dimension and a width dimension. The length dimension extends between a first end of the body and a second end of the body that is opposite the first end of the body. The width dimension extends between a first edge of the body and a second edge of the body that is opposite the first edge of the body. The width dimension of the body of each wall segment of the plurality of wall segments decreases along the length of the body as the body extends from the first end of the body to the second end of the body. The body of each wall segment of the plurality of wall segments includes a male portion and a female portion. The male portion of one wall segment is arranged within the female portion of another wall segment. A body of each wall segment of the plurality of wall segments is defined by an outer show surface and an inner surface. The inner surface at least partially defines the cavity.

In some instances, the inner surface includes a first segment of the width dimension of the body of each wall segment of the plurality of wall segments, a second segment of the width dimension of the body of each wall segment of the plurality of wall segments, and a third segment of the width dimension of the body of each wall segment of the plurality of wall segments. The first segment of the width dimension includes the male portion. The second segment of the width dimension includes the female portion. The third segment of the width dimension of the body extends between and connects the first segment of the width dimension of the body to the second segment of the width dimension of the body. The third segment of the width dimension of the body at least partially defines the cavity of the pillar member.

Yet another aspect of the disclosure provides a method for assembling the assembly. The method includes: providing a pillar member in a first, unwrapped state; transitioning the pillar member from the first, unwrapped state to an intermediate, partially wrapped state; further transitioning the pillar member from the intermediate, partially wrapped state to a second, wrapped state; and arranging at least one cap member upon the pillar member prior to arranging the pillar member in the second wrapped state for: disposing the at least one cap member at least proximate one of a distal end of the pillar member and a proximal end of the pillar member. Upon transitioning the pillar member to the second, wrapped state, the method includes non-removably connecting the at least one cap member to the pillar member for preventing axial movement of the at least one cap member relative the pillar member.

Implementations of the disclosure may include one or more of the following optional features. A cavity-forming surface of each wall segment of a plurality of wall segments defines an axial cavity extending along an axial length of pillar member. Each cavity-forming surface of each wall segment is defined by a non-constant cavity width dimension that decreases along the axial length of pillar member as the axial cavity axially extends from the distal end of the pillar member toward the proximal end of the pillar member.

In some implementations, the arranging the at least one cap member upon the pillar member step further includes: radially disposing at least one segment of a side surface of a flange portion of the at least one cap member within one or more radially-extending channels of one or more wall segments of the plurality of wall segments of the pillar member. The at least one cap member includes a plurality of side surface portions that are defined by a non-constant side surface width that decreases in an axial direction from the distal end of the pillar member toward the proximal end of the pillar member. The non-constant side surface width is approximately the same as but less than the non-constant cavity width dimension.

In some examples, the arranging the at least one cap member upon the pillar member step further includes: respectively arranging at least one side surface portion of a plurality of side surface portions of the at least one cap member opposite at least one cavity forming surface of a plurality of cavity-forming surfaces of the one or more wall segments of the plurality of wall segments of the pillar member. A proximal end of the body extends axially away from a distal surface of a lip portion of the at least one cap member. Each side surface portion of the body of the at least one cap member is defined by a non-constant side surface width that increases in an axial direction from the proximal end of the pillar member toward the distal end of the pillar member. The non-constant side surface width is approximately the same as but less than the non-constant cavity width dimension. The arranging the at least one cap member upon the pillar member step further includes: axially arranging at least one portion of the distal surface of the lip portion of the at least one cap member opposite the proximal surface of the pillar member.

The details of one or more implementations of the disclosure are set forth in the accompanying drawings and the description below. Other aspects, features, and advantages will be apparent from the description and drawings, and from the claims.

DESCRIPTION OF DRAWINGS

The drawings described herein are for illustrative purposes only of selected configurations and not all possible implementations, and are not intended to limit the scope of the present disclosure.

FIG. 19C is an even further assembled view of the assembly according to FIG. 19B with the pillar member arranged in a further intermediate state.

FIG. 19D is an assembled view of the assembly according to FIG. 19C with the pillar member arranged in the second state according to FIGS. 8-12.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The figures illustrate exemplary implementations of referred to as an assembly, which may be alternatively referred to as a leg assembly. The assembly may be attached to an article. In some instances, the article may be, for example, furniture, such as, for example, a chair, sofa or the like. Accordingly, the article may be referred to as an article of furniture; therefore, in some implementations, the assembly may be alternatively referred to as a furniture leg assembly. Based on the foregoing, it is to be generally understood that the nomenclature used herein is simply for convenience and the terms used herein should be given the broadest meaning by one of ordinary skill in the art.

Figure 1:
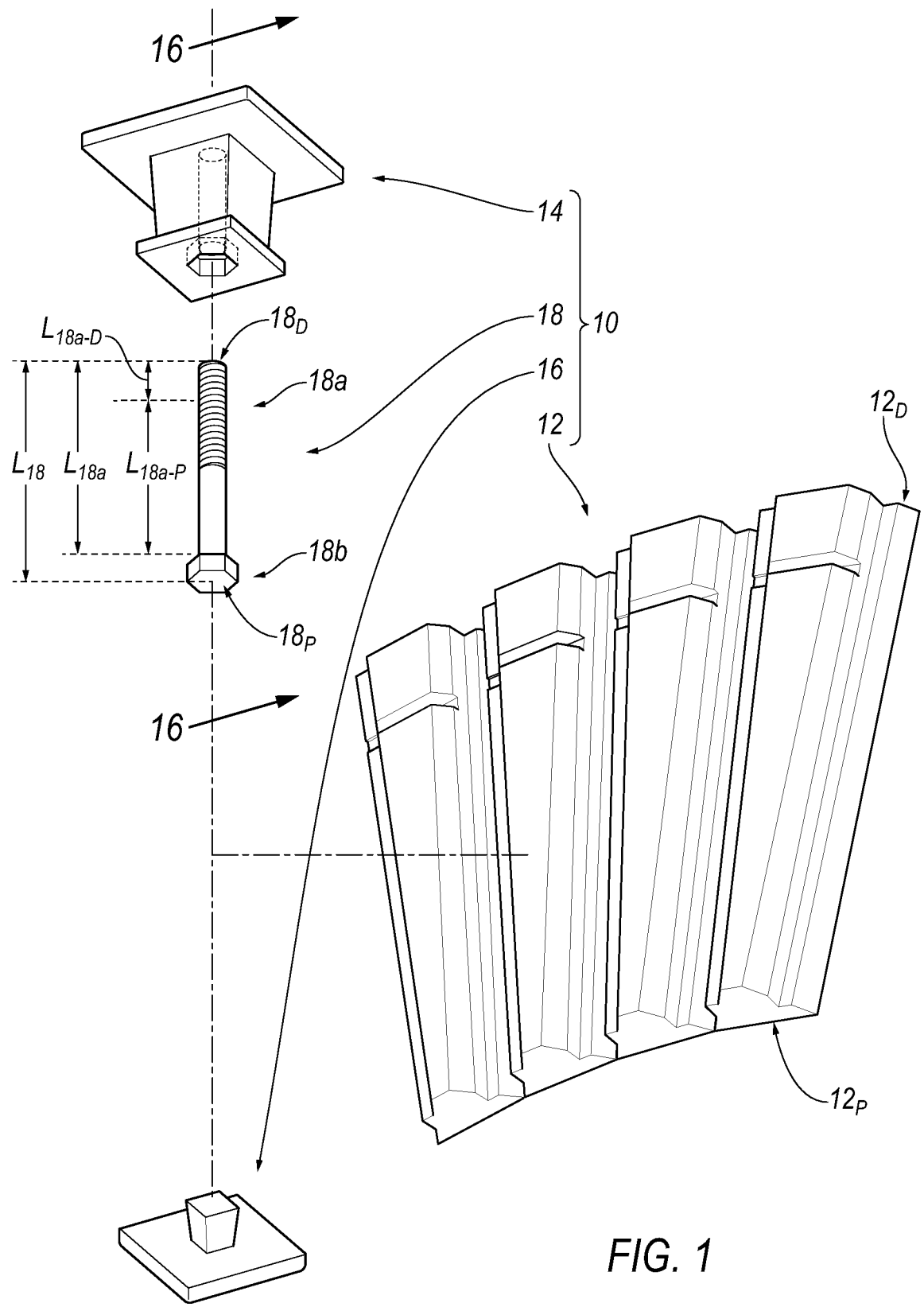
FIG. 1 is an exploded perspective view of an exemplary assembly.
Figure 2:
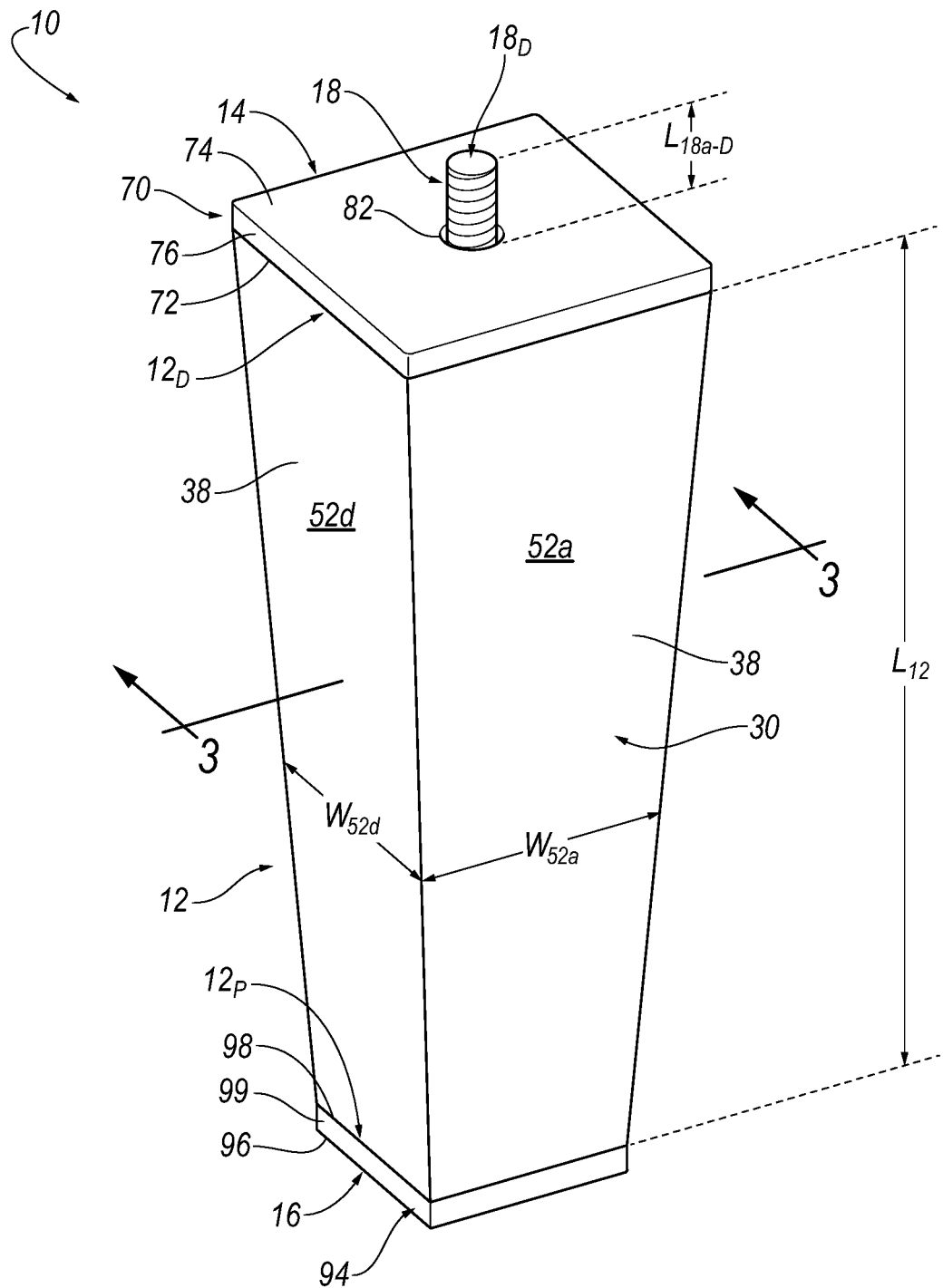
FIG. 2 is a perspective view of the assembly of FIG. 1.
Figure 3:
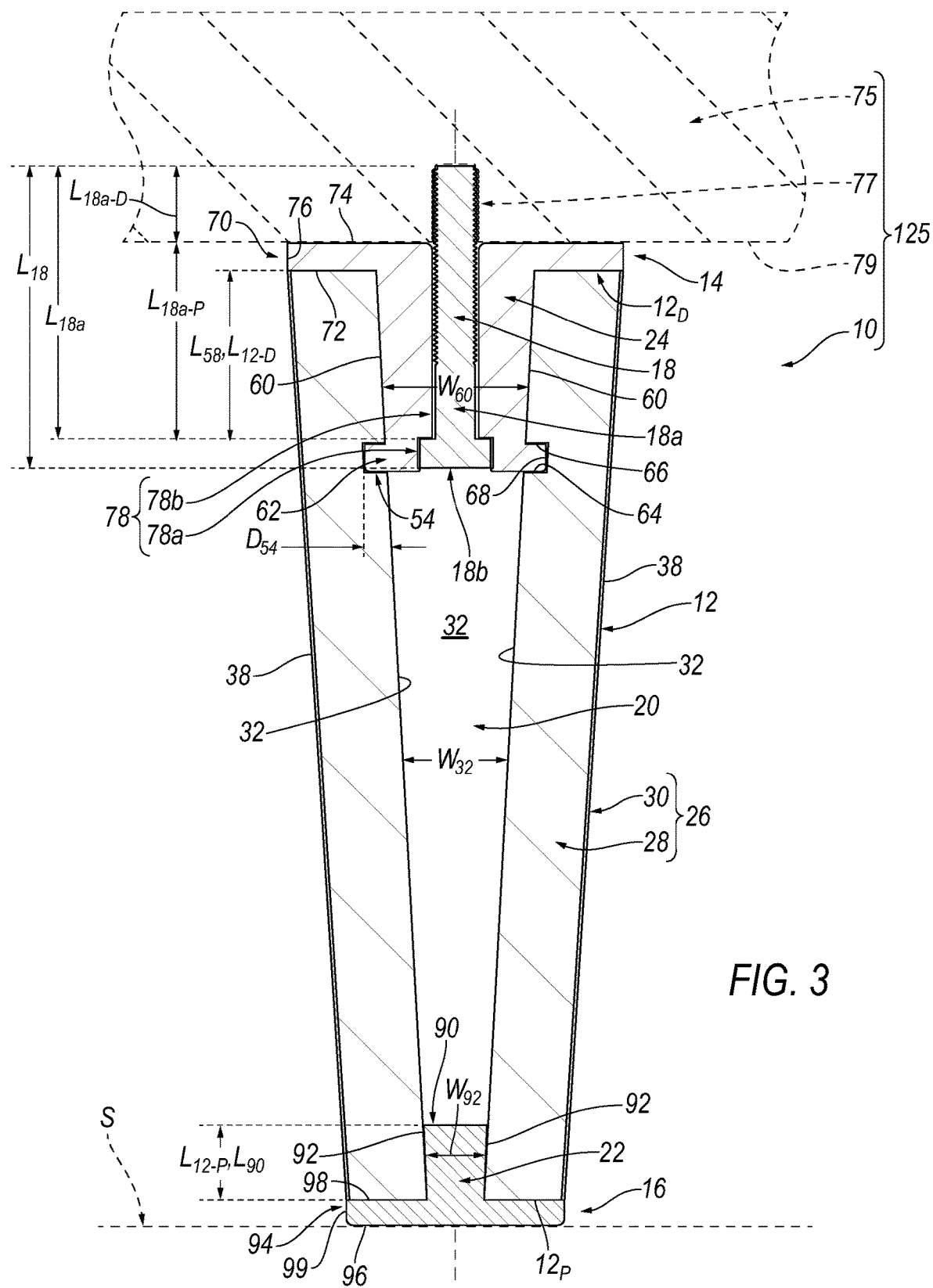
FIG. 3 is a cross-sectional view of the assembly according to line 3-3 of FIG. 2.

Referring to FIGS. 1-3, an assembly is shown generally at 10. The assembly 10 may include: a pillar member 12 (see also, e.g., FIGS. 4-12); a first cap member 14 (see also, e.g., FIGS. 13-14 and 16-18); and an optional second cap member 16 (see also, e.g., FIG. 15). A method of assembling the assembly 10 is seen at FIGS. 19A-19D.

Figure 4:
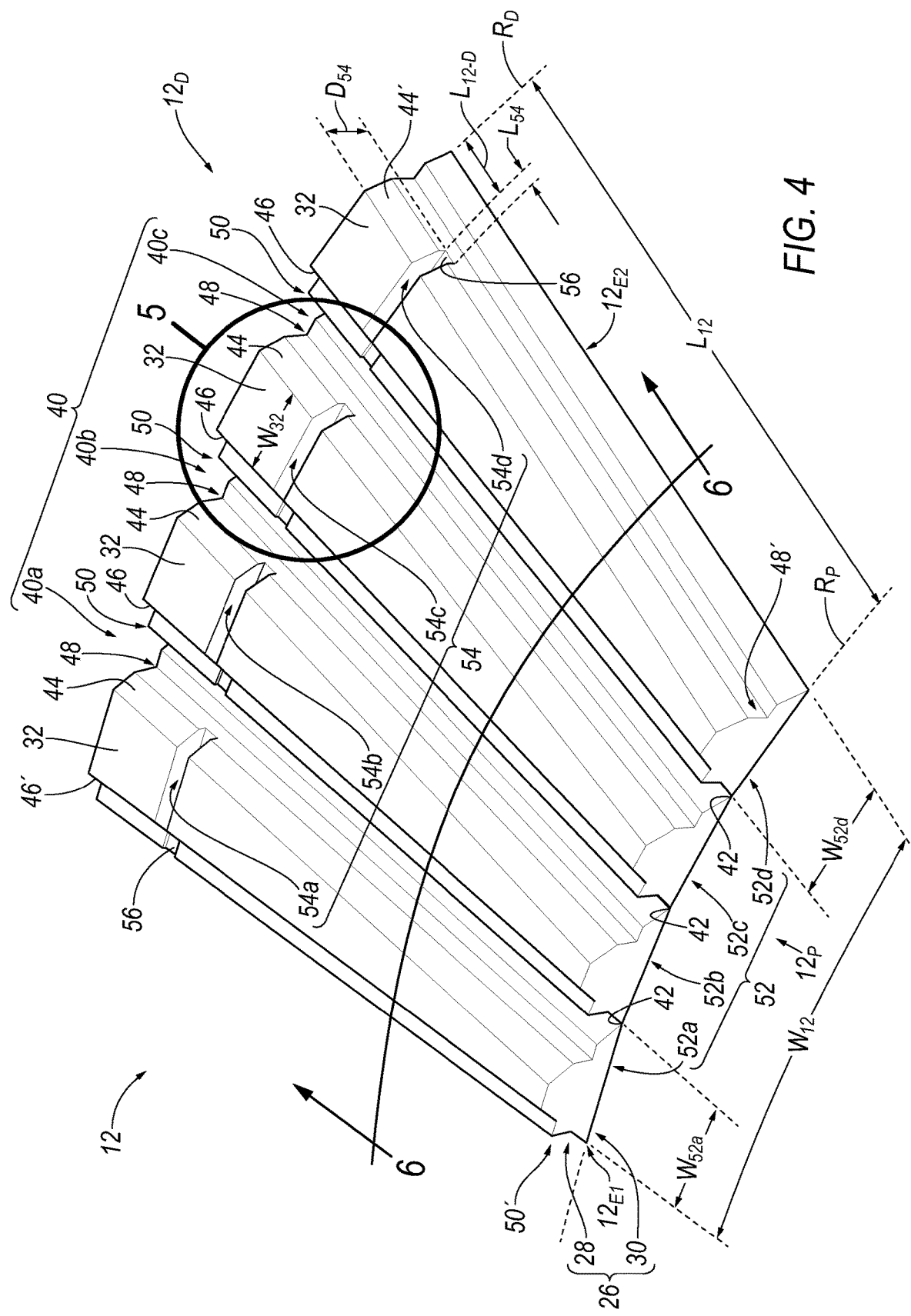
FIG. 4 is a perspective view of a pillar member of the assembly of FIGS. 1-3 arranged in a first state.
Figure 19A:
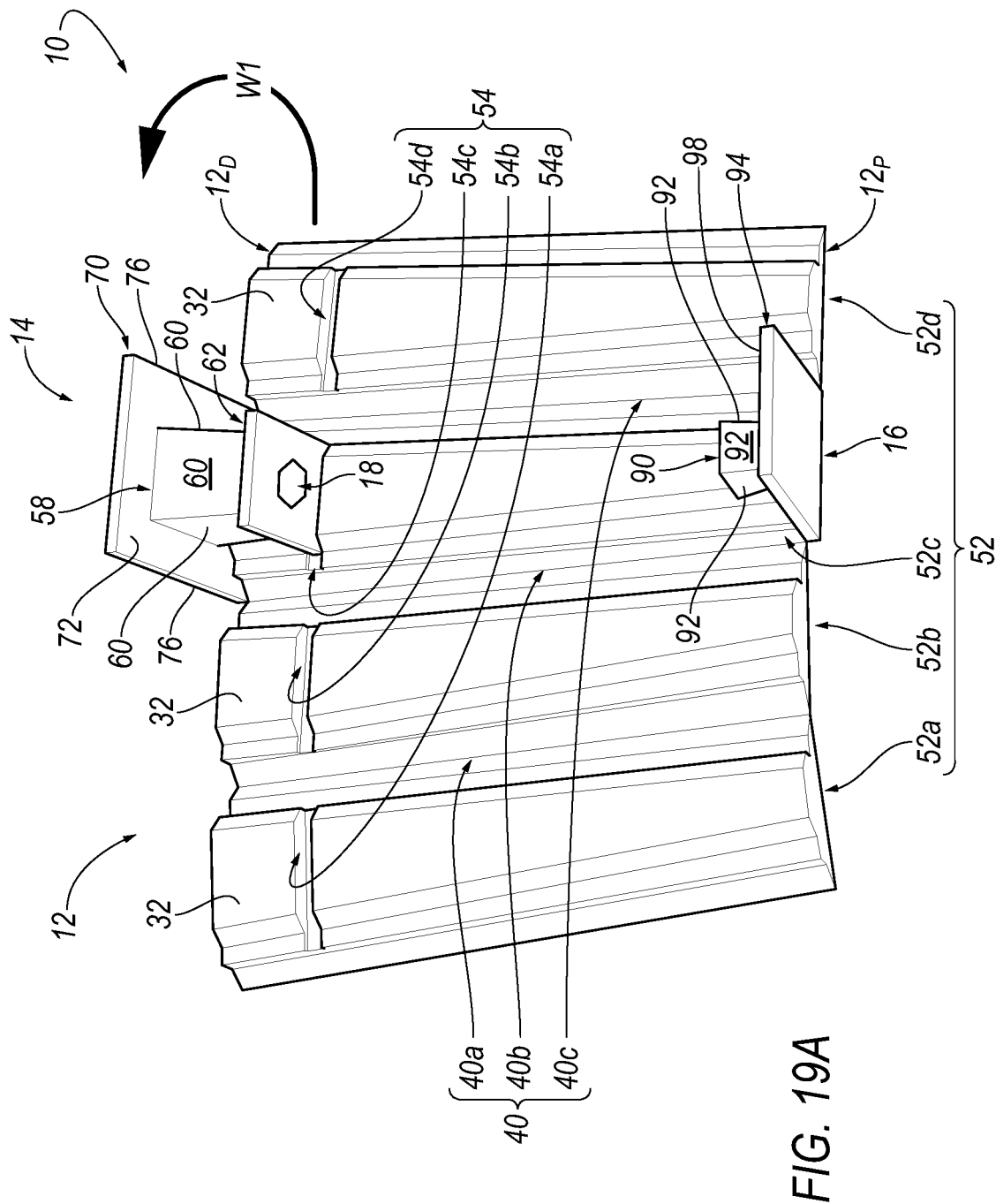
FIG. 19A is a partially assembled view of the assembly of FIG. 1 with the pillar member arranged in the first state according to FIGS. 4-7.
Figure 19B:
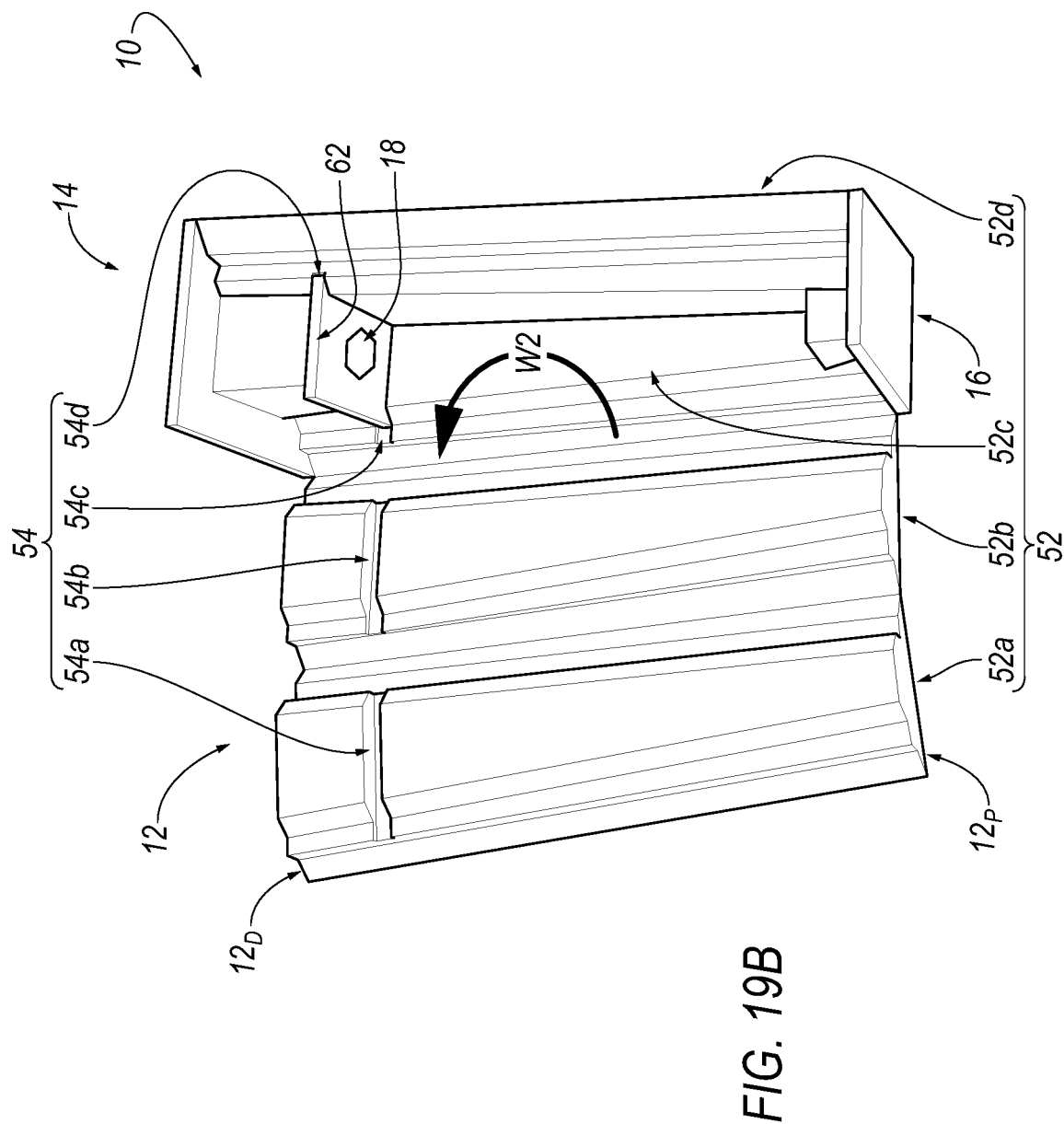
FIG. 19B is a further assembled view of the assembly according to FIG. 19A with the pillar member arranged in an intermediate state.

As seen at FIGS. 1, 4, and 19A, the pillar member 12 is shown in a first state, which may be alternatively referred to as an "unwrapped state" or an "unrolled state." With reference to FIGS. 2-3, 8-12, and 19D, the pillar member 12 is shown in a second state, which may be alternatively referred to as a "wrapped state" or a "rolled state." As seen at to FIGS. 19B and 19C, the pillar member 12 is shown in an intermediate state, which may be alternatively referred to as a "partially wrapped state" or a "partially rolled state" as the pillar member 12 transitions from the first state to the second state.

As seen at FIG. 19A (when the pillar member 12 is arranged in the first state), the first cap member 14 may be arranged upon, proximate, at, or about a distal end $12_D$ of the pillar member 12, and the optional second cap member 16 may be arranged upon, proximate, at, or about a proximal end $12p$ of the pillar member 12. Thereafter, as seen at FIGS. 19B and 19C, the pillar member 12 may be further manipulated (e.g., "wrapped" or "rolled") for transition from the first state to the intermediate state for partially securing one or both of the first cap member 14 and the optional second cap member 16, at, respectively, the distal end $12_D$ of the pillar member 12 and the proximal end $12p$ of the pillar member 12. Then, as seen at FIG. 19D, the pillar member 12 may be further manipulated (e.g., "wrapped" or "rolled") for transition from the intermediate state to the second state for non-removably-securing one or both of the first cap member 14 and the optional second cap member 16, at, respectively, the distal end $12_D$ of the pillar member 12 and the proximal end $12_P$ of the pillar member 12.

Figure 16:
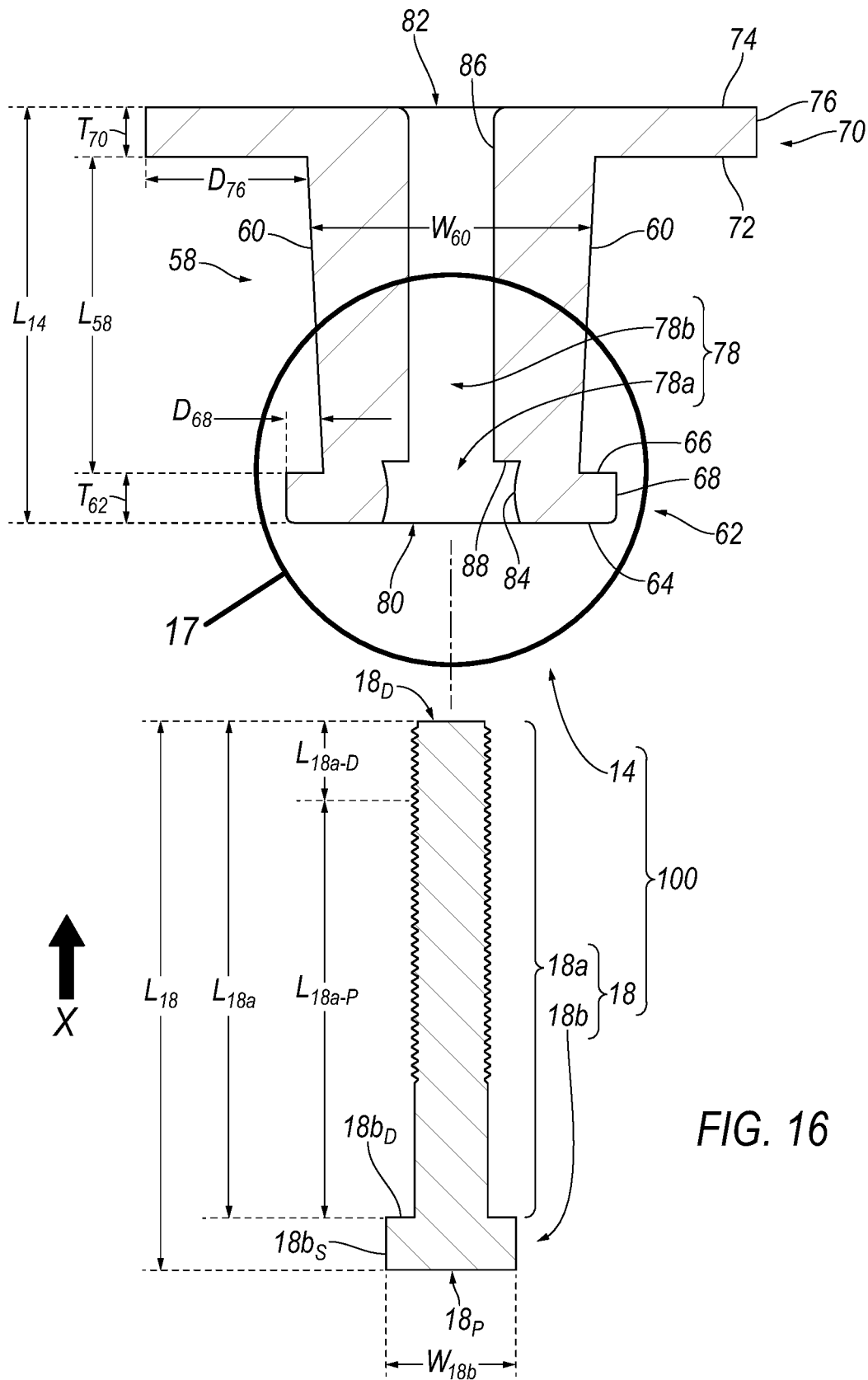
FIG. 16 is an exploded cross-sectional view of the first cap member and a fastener of the assembly according to line 16-16 of FIG. 1.
Figure 17:
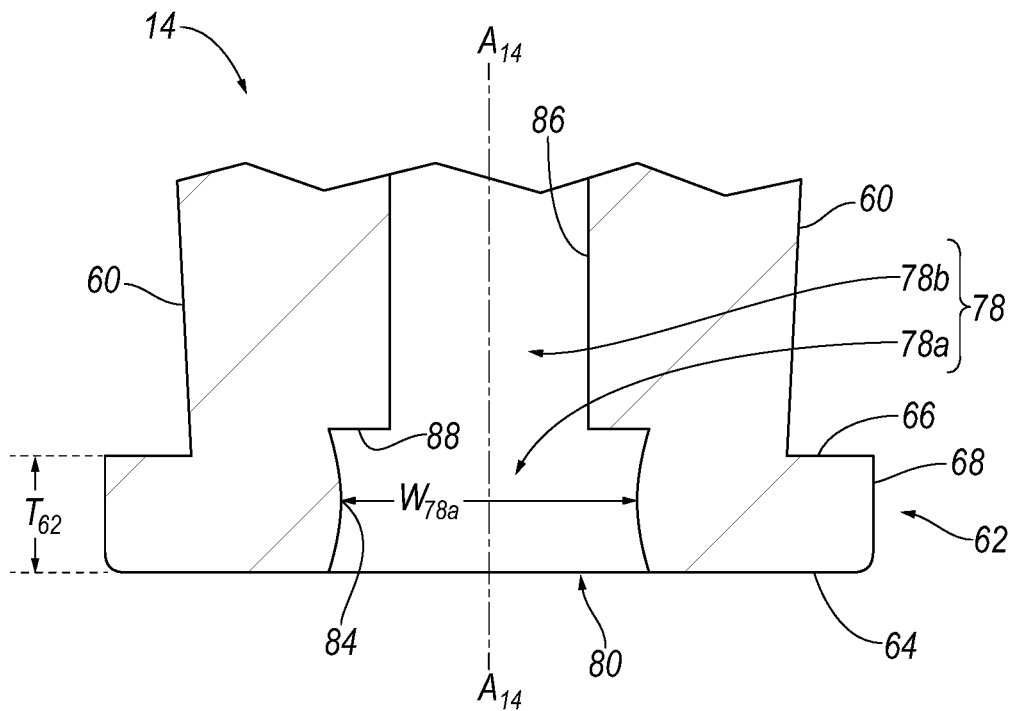
FIG. 17 is an enlarged exploded view of the first cap member and the fastener according to line 17 of FIG. 16.
Figure 18:
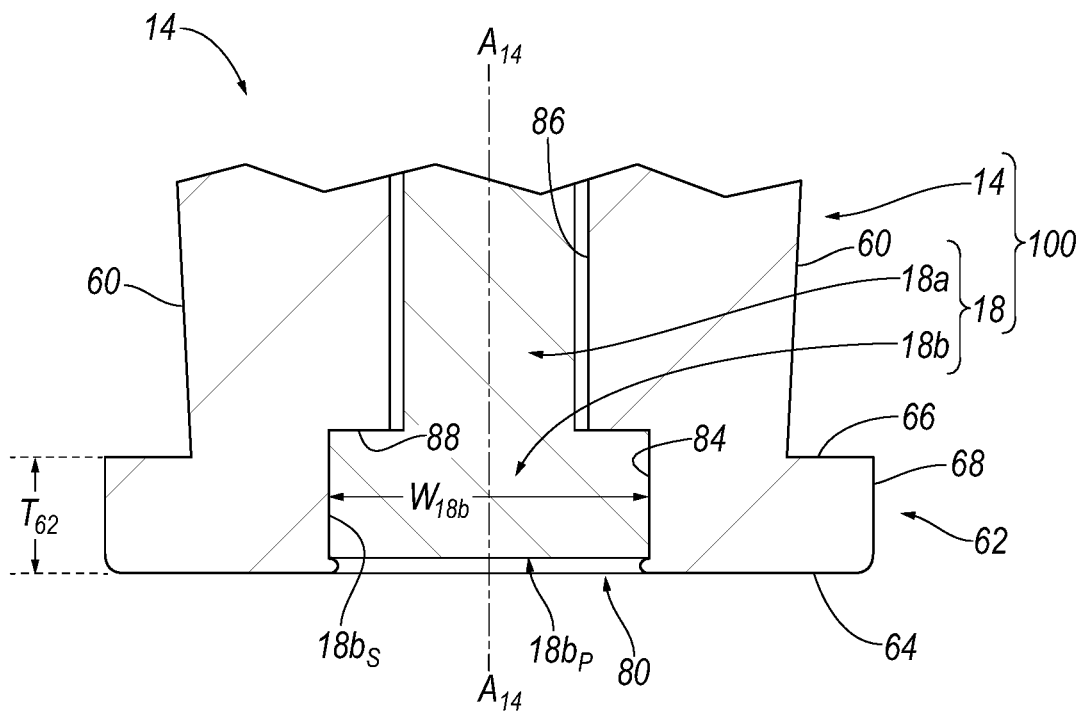
FIG. 18 is an enlarged assembled view of the first cap member and the fastener according to FIG. 17.

With reference to FIG. 1, the assembly 10 may also include a fastener 18 (see also, e.g., FIGS. 19A and 19B), which may be defined by a male portion 18a extending from a head portion 18b. A portion of a length $L_{18}$ of the fastener 18 extending from a distal end $18_D$ of the fastener 18 defined by the male portion 18a may include a threaded surface (i.e., the fastener 18 may be referred to as a "threaded fastener"). The length $L_{18}$ of the fastener 18 may extend between a proximal end 18p of the of the fastener 18 defined by the head portion 18b and the distal end $18_D$ of the fastener 18 at a terminal end of the male portion 18a that is opposite of the head portion 18b. In some configurations, the fastener 18 may be integrally formed with the first cap member 14; however, in other configurations, as seen at, for example, FIGS. 1 and 3, the fastener 18 may be a separate component that is joined to the first cap member 14 (e.g., in a friction-fit configuration as seen at FIGS. 16-18, or, alternatively, in, for example, an over-molding configuration, with adhesive, or the like).

With reference to FIG. 1, the male portion 18a may be generally defined by a length $L_{18a}$ having: a proximal length portion $L_{18a\text{-}P}$ extending axially away from the head portion 18b; and a distal length portion $L_{18a\text{-}D}$ extending axially away from the proximal length portion $L_{18a\text{-}P}$. As seen at FIG. 3, the head portion 18b and the proximal length portion $L_{18a\text{-}P}$ of the male portion 18a are configured to be received within a portion of a cavity or passageway of the first cap member 14. However, as seen at FIGS. 2 and 3, the distal length portion $L_{18a\text{-}D}$ of the male portion 18a of the fastener 18 is configured to extend outside of the portion of a cavity or passageway of the first cap member 14. Accordingly, as seen at FIG. 3, the distal length portion $L_{18a-D}$ of the male portion 18a of the fastener 18 is configured to be received within a corresponding female portion (see, e.g., cavity 77 at FIG. 3) of an article (see, e.g., article 75 at FIG. 3). Therefore, in some configurations of the assembly 10, when the distal length portion $L_{18a-D}$ of the male portion 18a of the fastener 18 is utilized for securing the assembly 10 to the article 75, the assembly 10 and the article 75 may cooperate to define a sub-assembly (see, e.g., sub-assembly 125 at FIG. 3).

When connected to the article 75 to form the sub-assembly 125, the assembly 10 may function as a load-bearing support member, a vertical support member, a leg, or the like that supports the article 75 upon a floor or support surface (see, e.g., floor or support surface S at FIG. 3). Furthermore, in some instances, a plurality of assemblies 10 may be secured to the article 75 in a similar fashion for supporting the article 75 at multiple locations upon the floor or support surface S.

In some implementations, the article 75 may be furniture, such as, for example, a chair, a stool, a sofa, a couch, an ottoman, a table, a desk, a dresser, a cabinet, a wardrobe, or the like; accordingly, the article 75 may be referred to as an "article of furniture". Furthermore, the assembly 10 may be alternatively referred to as a "leg assembly" or a "furniture leg assembly". In some instances, the first cap member 14 of the assembly 10 may be alternatively referred to as a furniture-engaging member as a result of at least one surface portion (see, e.g., a distal surface 74 of a lip portion 70 at FIGS. 2, 3, 13-14, and 16) of the first cap member 14 being in contact with or arranged proximate or opposite a portion of an underside surface (see, e.g., underside surface 79 at FIG. 3, which may or may not also include the cavity 77) of the article of furniture 75. Although the first cap member 14 may integrally include, or, may be configured to secure the fastener 18 thereto, the first cap member 14 may engage and be connected to the underside surface 79 of the article of furniture 75 without the fastener 18 in another manner, such as, for example, with one or a combination of integrally-formed or separately-formed barbs, projections, staples, adhesive, or the like that is/are disposed upon or extend(s) from, for example, the at least one surface portion (see, e.g., the distal surface 74 of a lip portion 70) of the first cap member 14 or the underside surface 79 of the article of furniture 75.

Although the fastener 18, barbs, projections, staples, adhesive, and the like are described above for attaching the assembly 10 to the article 75, in some instances, the assembly 10 may be disposed adjacent the underside surface 79 of the article 75 and is not attached to the article 75 (e.g., in some instances, the fastener 18 may be an optional component). Furthermore, in some instances, the pillar member 12, alone, may be utilized for functioning as a load-bearing support member, a vertical support member, a leg, or the like that axially supports the article 75 upon or over the floor or support surface S; therefore, in some configurations, both of the first cap member 14 and the fastener 18 may be optional components, and, as such, the pillar member 12 may be utilized alone (i.e., without the first cap member 14, the optional second cap member 16, and the fastener 18) for supporting the article 75 over the floor or support surface S.

With reference to FIG. 3, when assembled, the assembly 10 may be hollow and define a tapering cavity 20 as the cavity extends from the distal end $12_D$ of the pillar member 12 to the proximal end $12_p$ of the pillar member 12. If, for example, the optional second cap member 16 is not included in the design of the assembly 10, the pillar member 12 may define a proximal opening 22 (see also FIGS. 9 and 12) that may expose the tapering cavity 20 to surrounding atmosphere at the proximal end $12_p$ of the pillar member 12. Accordingly, if the second cap member 16 is included in the design of the assembly 10, the second cap member 16 may be alternatively referred to as a closure member that closes-out the proximal opening 22 of the pillar member 12. Similarly, if, for example, the first cap member 14 is not included in the design of the assembly 10, the pillar member 12 may define a distal opening 24 (see also FIGS. 8 and 10) that may expose the tapering cavity 20 to surrounding atmosphere at the distal end $12_D$ of the pillar member 12.

Figure 5:
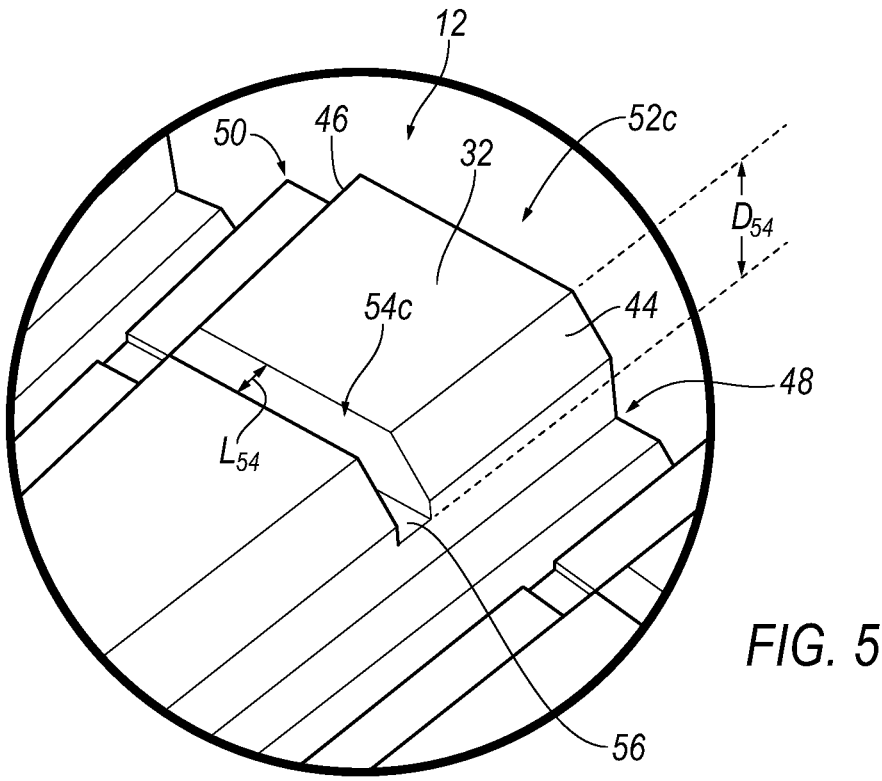
FIG. 5 is an enlarged view of the pillar member according to line 5 of FIG. 4.
Figure 6:
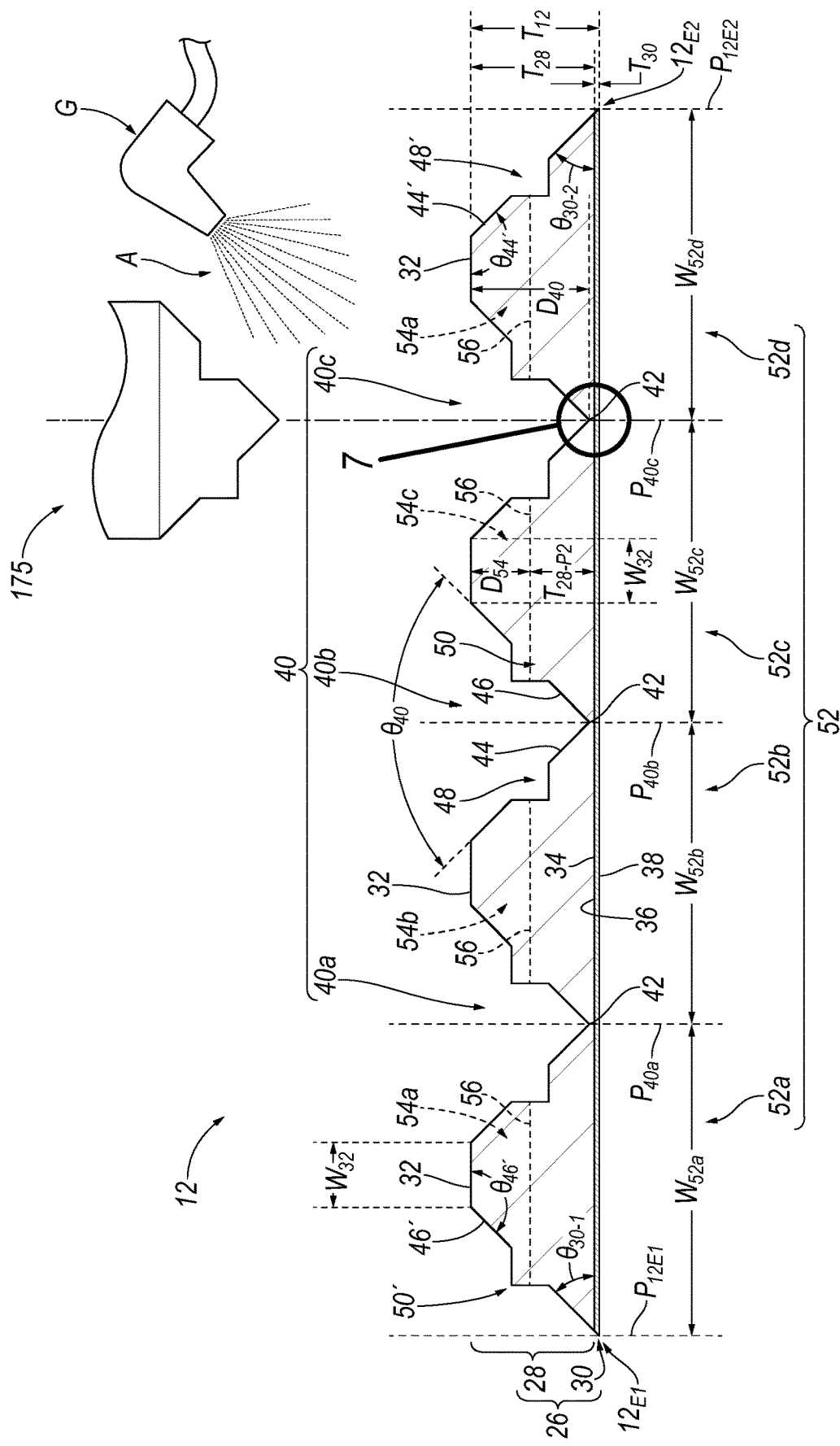
FIG. 6 is a cross-sectional view of the pillar member according to arcuate line 6-6 of FIG. 4.
Figure 8:
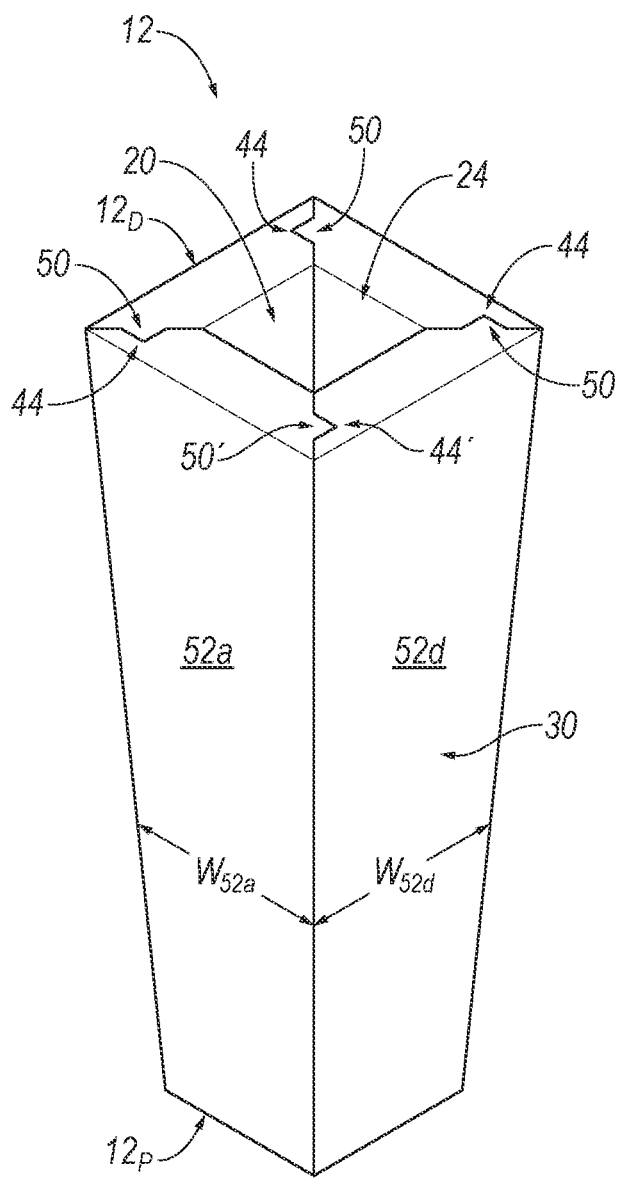
FIG. 8 is a top perspective view of the pillar member of FIG. 7 arranged in a second state.
Figure 9:
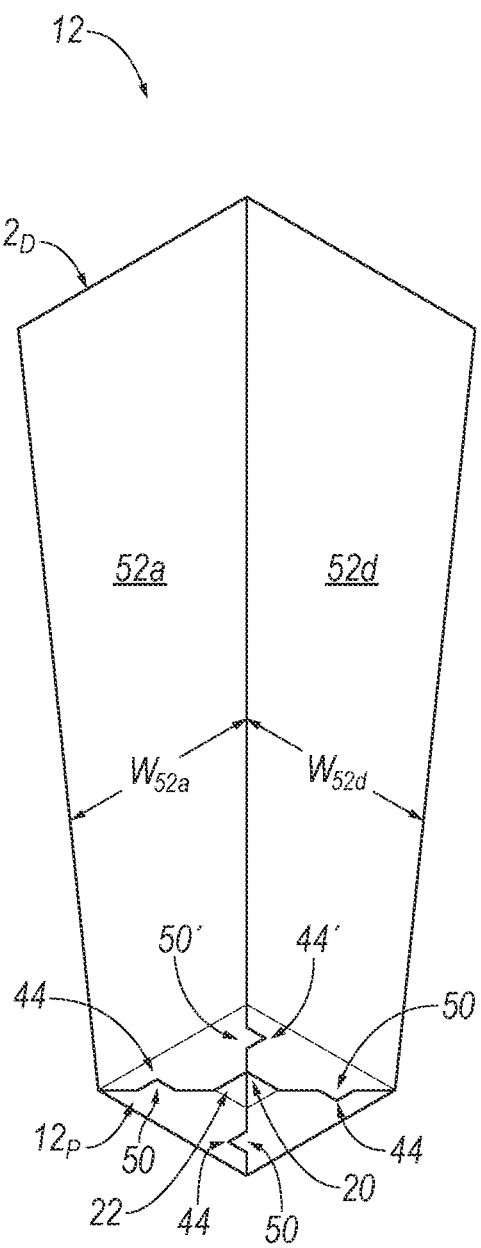
FIG. 9 is a bottom perspective view of the pillar member of FIG. 7 arranged in the second state.
Figure 10:
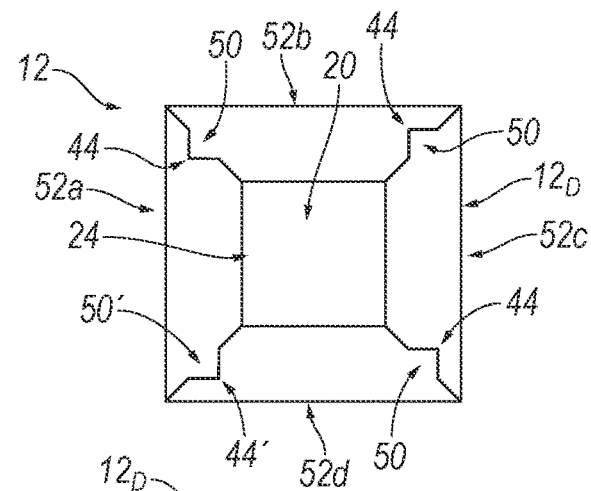
FIG. 10 is a top view of the pillar member of FIG. 7 arranged in the second state.
Figure 11:
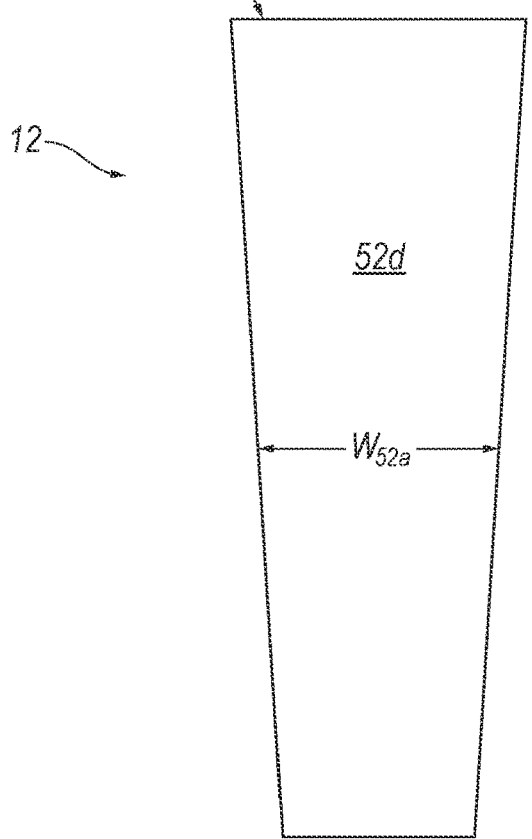
FIG. 11 is a side view of the pillar member of FIG. 7 arranged in the second state.
Figure 12:
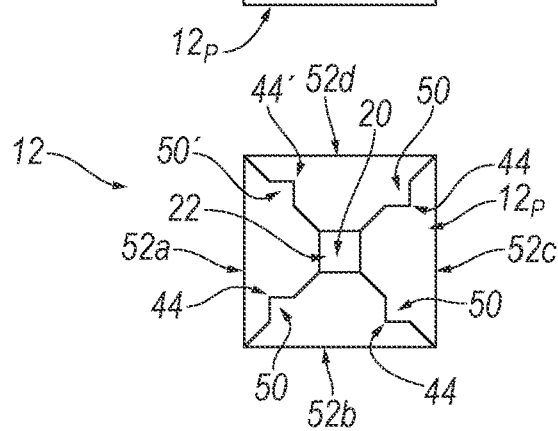
FIG. 12 is a bottom view of the pillar member of FIG. 7 arranged in the second state.

Referring now to FIGS. 4-7, an exemplary configuration of the pillar member 12 is described. As seen at FIG. 6, when arranged in the first state, the pillar member 12 may be defined by a thickness $T_{12}$ that is further defined by a plurality of sub-thicknesses (see, e.g., $T_{28}$, $T_{30}$) for defining a layered construct 26 having at least, for example, a first layer of material 28 and a second layer of material 30. The layered construct 26 may be initially provided as a large, virgin sheet (e.g., approximately eight feet by four feet) whereby each thickness of the plurality of sub-thicknesses $T_{28}$, $T_{30}$ are defined by a constant or uniform thickness. Subsequently, as seen at FIG. 6, a tool 175 is utilized for machining the layered construct 26 that results in removal of material (e.g., a removal of material at selected regions of at least one of the thicknesses of the plurality of sub-thicknesses $T_{28}$, $T_{30}$).

In some configurations, the first layer of material 28 and the second layer of material 30 of the layered construct 26 may be referred to, respectively, as a substrate layer and a skin layer. The substrate layer 28 may be defined by a thickness $T_{28}$ of the plurality of sub-thicknesses $T_{28}$, $T_{30}$, and the skin layer 30 may be defined by a thickness $T_{30}$ of the plurality of sub-thicknesses $T_{28}$, $T_{30}$. The thickness $T_{28}$ of the substrate layer 28 may be greater than the thickness $T_{30}$ of the skin layer 30. With reference to FIGS. 2 and 3, the skin layer 30 generally forms an outer or outwardly-facing surface (see, e.g., an outwardly-facing surface 38 of the skin layer 30) of the assembly 10, and, as seen at FIG. 3, a portion of the substrate layer 28 defines an inner or inwardly-facing surface (see, e.g., an inwardly-facing surface 32) of the assembly 10.

As seen at FIG. 6, the thickness $T_{28}$ of the substrate layer 28 may extend between the inwardly-facing surface 32 of the substrate layer 28 and an outwardly-facing, skin-engaging surface 34 of the substrate layer 28. Furthermore, the thickness $T_{28}$ of the substrate layer 28 (prior to being machined by the tool 175 and extending between the inwardly-facing surface 32 and the outwardly-facing, skin-engaging surface 34) may be between about 4.6 mm to about 25.4 mm.

The thickness $T_{30}$ of the skin layer 30 may extend between an inwardly-facing, substrate-engaging surface 36 of the skin layer 30 and the outwardly-facing surface 38 of the skin layer 30. Furthermore, the thickness $T_{30}$ of the skin layer 30 may be between 0.0254 mm to 0.635 mm.

The substrate layer 28 and the skin layer 30 may each be formed from one or more of a variety of materials. In some implementations, the substrate layer 28 may be formed from a medium-density fiberboard material, a polymer material (e.g., polyvinyl chloride), a particle board material, or the like. In other implementations, the skin layer 30 may be formed from a paper material, a polymer material (e.g., polypropylene), or the like.

As seen at FIG. 6, a method of forming the pillar member 12 (that is arranged in the first state) may include providing the tool 175 (e.g., a router, a blade, a bit, etc.) and using the tool 175 to remove material defining the substrate layer 28 at selected regions for forming a plurality of primary channels 40 that extend into the thickness $T_{28}$ of the substrate layer 28. In some instances, the tool 175 may be utilized for miter-cutting the plurality of primary channels 40 into the thickness $T_{28}$ of the substrate layer 28 without engaging or removing any material defining the thickness $T_{30}$ of the skin layer 30.

The plurality of primary channels 40 may include, for example: a first primary channel 40a, a second primary channel 40b, and a third primary channel 40c. Each primary channel 40a, 40b, 40c of the plurality of primary channels 40 may extend into the thickness $T_{28}$ of the substrate layer 28 at a primary channel depth $D_{40}$ (which may vary between each of each of the primary channels 40a, 40b, 40c). At its maximum depth (at, e.g., a bottom-most surface or valley 42 of each of the primary channels 40a, 40b, 40c), the primary channel depth $D_{40}$ may be approximately equal to but slightly less than the thickness $T_{28}$ of the substrate layer 28.

Figure 7:
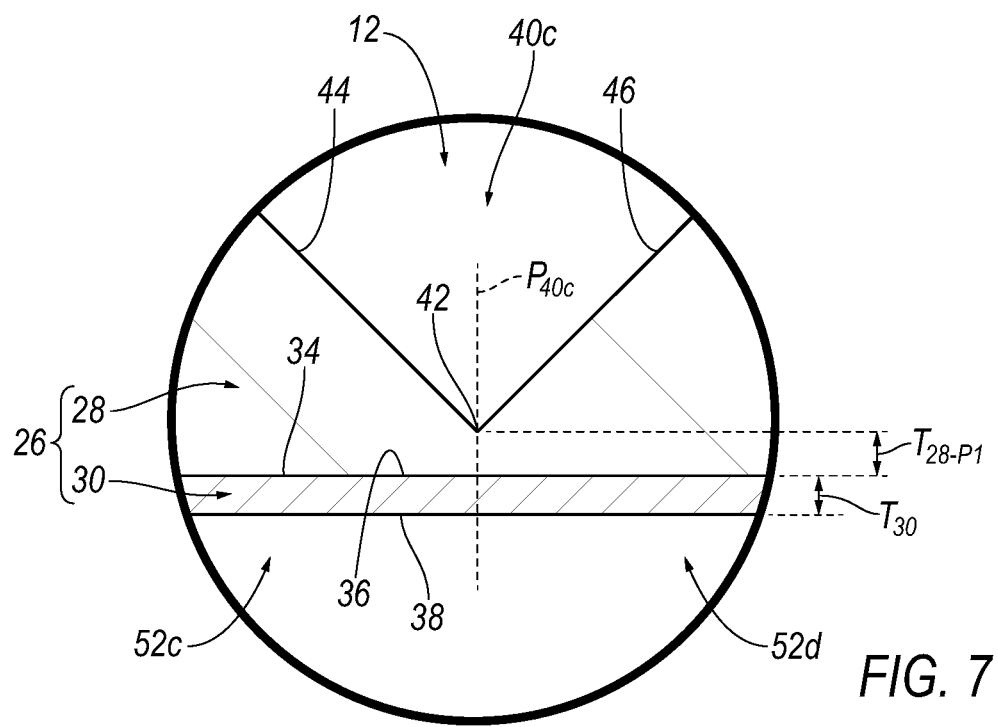
FIG. 7 is an enlarged view of the pillar member according to line 7 of FIG. 6.

The maximum depth of the primary channel depth $D_{40}$ is defined by a depth dimension extending between the inwardly-facing surface 32 of the substrate layer 28 and the bottom-most surface or valley 42 of each primary channel 40a, 40b, 40c of the plurality of primary channels 40 such that a first thickness portion $T_{28-P1}$ (see, e.g., FIG. 7) of the thickness $T_{28}$ of the substrate layer 28 is not removed by the tool 175. As seen at FIG. 7, the first thickness portion $T_{28-P1}$ of the thickness $T_{28}$ of the substrate layer 28 that is not removed by the tool 175 may extend between the bottom-most surface or valley 42 of each primary channel 40a, 40b, 40c of the plurality of primary channels 40 and the inwardly-facing substrate-engaging surface 36 of the skin layer 30.

Referring back to FIG. 6, each primary channel 40a, 40b, 40c of the plurality of primary channels 40 may be defined by a first primary channel surface portion 44 and a second primary channel surface portion 46. The first primary channel surface portion 44 and the second primary channel surface portion 46 extend from the bottom-most surface or valley 42 and cooperate to define a first primary channel angle $\theta_{40}$. In some configurations, the first primary channel angle $\theta_{40}$ may be approximately equal to 90°.

The first primary channel surface portion 44 may also define a female recess 48 that extends into the first primary channel surface portion 44. The second primary channel surface portion 46 may define a corresponding male portion 50 that extends away from the second primary channel surface portion 46. Each of female recesses 48 and male portions 50 may extend from the proximal end 12p to the distal end $12_D$ of the pillar member 12.

Furthermore, the tool 175 may also shape or form the substrate layer 28 of the pillar member 12 to include a first side surface portion 46' that is substantially similar to the second primary channel surface portion 46 of each primary channel 40a, 40b, 40c of the plurality of primary channels 40. Like the second primary channel surface portion 46, the first side surface portion 46' may include a male portion 50' that extends away from the first side surface portion 46'.

Yet even further, the tool 175 may also shape or form the substrate layer 28 of the pillar member 12 to include a second side surface portion 44' that is substantially similar to the first primary channel surface portion 44 of each primary channel 40a, 40b, 40c of the plurality of primary channels 40. Like the first primary channel surface portion 44, the second side surface portion 44' may include a female recess 48' that extends into the second side surface portion 44'. As will be discussed in the following disclosure at FIGS. 19C-19D, when arranging the pillar member 12 in the second state, the male portion 50' of the first side surface portion 46' corresponds to and is configured for arrangement within the female recess 48' of the second side surface portion 44'.

With continued reference to FIG. 6, a plane (see, e.g., $P_{40a}$, $P_{40b}$, $P_{40c}$) is shown extending across each primary channel 40a, 40b, 40c of the plurality of primary channels 40. For example: (1) a first plane $P_{40a}$ is shown extending across the first primary channel 40a; (2) a second plane $P_{40b}$ is shown extending across the second primary channel 40b; and (3) a third plane $P_{40c}$ is shown extending across the third primary channel 40c. Yet even further, as also seen at FIG. 6, a first end plane $P_{12E1}$ is shown extending across a first end $12_{E1}$ of the pillar member 12, and a second end plane $P_{12E2}$ is shown extending across a second end $12_{E2}$ of the pillar member 12.

Each of the planes $P_{40a}$, $P_{40b}$, $P_{40c}$ are parallel with one another and respectively extend across each primary channel 40a, 40b, 40c orthogonally with respect to and intersect the inwardly-facing substrate-engaging surface 36 of the skin layer 30 and the bottom-most surface or valley 42 of each primary channel 40a, 40b, 40c of the plurality of primary channels 40. Furthermore, as seen at FIG. 6, the first end plane $P_{12E1}$ and the second end plane $P_{12E2}$ are arranged in parallel with the planes $P_{40a}$, $P_{40b}$, $P_{40c}$.

The plurality of primary channels 40, the first side surface portion 46', and the second side surface portion 44' also define the layered construct 26 of the pillar member 12 (that is arranged in the first state as seen at FIG. 6) to include a plurality of wall segments 52. In some configurations, the plurality of wall segments 52 include: a first wall segment 52a; a second wall segment 52b; a third wall segment 52c; and a fourth wall segment 52d.

As seen at FIG. 6, the first wall segment 52a is defined by an arcuate width $W_{52a}$ extending between the first end plane $P_{12E1}$ and the first plane $P_{40a}$. The second wall segment 52b is defined by an arcuate width $W_{52b}$ that extends between the first plane $P_{40a}$ and the second plane $P_{40b}$. The third wall segment 52c is defined by an arcuate width $W_{52c}$ extending between the second plane $P_{40b}$ and the third plane $P_{40c}$. The fourth wall segment 52d is defined by an arcuate width $W_{52d}$ extending between the third plane $P_{40c}$ and the second end plane $P_{12E2}$.

With continued reference to FIG. 6, the first side surface portion 46' extends from the inwardly-facing surface 32 of the substrate layer 28 that defines the first wall segment 52a. Furthermore, the first side surface portion 46' extends from the inwardly-facing surface 32 of the substrate layer 28 of the first wall segment 52a at an angle $\theta_{46'}$. The angle $\theta_{46'}$ may be approximately equal to about 135°. Yet even further, the tool 175 may also shape or form the skin layer 30 that extends from the first side surface portion 46' at an angle $\theta_{30-1}$. The angle $\theta_{30-1}$ may be approximately equal to about 45°.

Furthermore, the second side surface portion 44' extends from the inwardly-facing surface 32 of the substrate layer 28 that defines the fourth wall segment 52d. The second side surface portion 44' extends from the inwardly-facing surface 32 of the substrate layer 28 of the fourth wall segment 52d at an angle $\theta_{44'}$. The angle $\theta_{44'}$ may be approximately equal to about 135°. Yet even further, the tool 175 may also shape or form the skin layer 30 that extends from the second side surface portion 44' at an angle $\theta_{30-2}$. The angle $\theta_{30-2}$ may be approximately equal to about 45°.

As seen at FIG. 4, when arranged in the first state, the pillar member 12 is generally defined to have an arcuate shape having a length $L_{12}$ that extends between a proximal arcuate reference line $R_P$ aligned with the proximal end $12_P$ of the pillar member 12 and a distal arcuate reference line $R_D$ aligned with the distal end $12_D$ of the pillar member 12. The pillar member 12 is also generally defined to have an arcuate width $W_{12}$ extending between the first end $12_{E1}$ of the pillar member 12 (that is defined by the first wall segment 52a) and the second end $12_{E2}$ of the pillar member 12 (that is defined by the fourth wall segment 52d). The arcuate width $W_{52a}$, $W_{52b}$, $W_{52c}$, $W_{52d}$ of each wall segment 52a, 52b, 52c, 52d of the plurality of wall segments 52 collectively defines the arcuate width $W_{12}$ of the pillar member 12; furthermore, the arcuate width $W_{52a}$, $W_{52b}$, $W_{52c}$, $W_{52d}$ of each wall segment 52a, 52b, 52c, 52d of the plurality of wall segments 52 is one-fourth of the arcuate width $W_{12}$ of the pillar member 12 (due to, according to the exemplary implementation of the pillar member 12 described at FIGS. 4 and 6 having four wall segments 52a, 52b, 52c, 52d).

As seen at FIG. 4, the arcuate width $W_{12}$ of the pillar member 12 is defined to be non-constant, tapering, or narrowing as the arcuate width $W_{12}$ of the pillar member 12 extends along the length $L_{12}$ of the pillar member 12 from the distal end $12_D$ of the pillar member 12 to the proximal end $12_P$ of the pillar member 12. Accordingly, as seen at FIG. 4, the arcuate width $W_{52a}$, $W_{52b}$, $W_{52c}$, $W_{52d}$ of each wall segment 52a, 52b, 52c, 52d of the plurality of wall segments 52 is also non-constant, tapering, or narrowing as the arcuate width $W_{52a}$, $W_{52b}$, $W_{52c}$, $W_{52d}$ of each wall segment 52a, 52b, 52c, 52d of the plurality of wall segments 52 extends along the length $L_{12}$ of the pillar member 12 from the distal end $12_D$ of the pillar member 12 to the proximal end $12_P$ of the pillar member 12. As a result of the narrowing or tapering of each arcuate width $W_{52a}$, $W_{52b}$, $W_{52c}$, $W_{52d}$ of each wall segment 52a, 52b, 52c, 52d of the plurality of wall segments 52, with reference to FIG. 2 (and also to FIG. 4), when the pillar member 12 is arranged in the second state, each wall segment 52a, 52b, 52c, 52d of the plurality of wall segments 52 narrows or tapers as each wall segment 52a, 52b, 52c, 52d of the plurality of wall segments 52 extends along the length $L_{12}$ of the pillar member 12 from the distal end $12_D$ of the pillar member 12 to the proximal end $12_P$ of the pillar member 12.

In addition to the narrowing or tapering of each arcuate width $W_{52a}$, $W_{52b}$, $W_{52c}$, $W_{52d}$ of each wall segment 52a, 52b, 52c, 52d of the plurality of wall segments 52, the inwardly-facing surface 32 of each wall segment 52a, 52b, 52c, 52d of the plurality of wall segments 52 is also defined by a tapering arcuate width, which is seen generally at $W_{32}$ in FIGS. 3 and 4. The tapering arcuate width $W_{32}$ of each the inwardly-facing surface 32 defines a portion of the arcuate width $W_{52a}$, $W_{52b}$, $W_{52c}$, $W_{52d}$ of each wall segment 52a, 52b, 52c, 52d of the plurality of wall segments 52. As will be described in the following disclosure at FIGS. 19A-19D, a portion of the tapering arcuate width $W_{32}$ of each the inwardly-facing surface 32 extending from the distal end $12_D$ of the pillar member 12 may be similar to a tapering width (see, e.g., tapering width $W_{60}$ at FIGS. 13, 14, and 16 of each side surface 60 of a body 58) of a surface portion of the second cap member 16.

As seen at FIG. 4, a method of forming the pillar member 12 (that is arranged in the first state) may further include providing the tool 175 (e.g., a router, a blade, a bit, etc.) and using the tool 175 to form a plurality of secondary channels 54 that extend into the thickness $T_{28}$ of the substrate layer 28. In some instances, the tool 175 may be utilized for miter-cutting the plurality of secondary channels 54 into the thickness $T_{28}$ of the substrate layer 28 without engaging or removing any material defining the thickness $T_{30}$ of the skin layer 30. As seen at FIG. 4, the plurality of primary channels 40 are formed into the substrate layer 28 in a length direction of the pillar member 12 along the length $L_{12}$ of the pillar member 12. In some configurations, the plurality of secondary channels 54 may be formed into the substrate layer 28 along the arcuate width direction according to the arcuate width $W_{12}$ of the pillar member 12 at a lengthwise distance $L_{12-D}$ away from the distal end $12_D$ of the pillar member 12.

The plurality of secondary channels 54 may include, for example: a first secondary channel 54a, a second secondary channel 54b, a third secondary channel 54c, and a fourth secondary channel 54d. Each secondary channel 54a, 54b, 54c, 54d of the plurality of secondary channels 54 may be defined by a lengthwise dimension $L_{54}$ (see, e.g., FIGS. 4 and 6). Furthermore, each secondary channel 54a, 54b, 54c, 54d of the plurality of secondary channels 54 may extend into the thickness $T_{28}$ of the substrate layer 28 at a secondary channel depth $D_{54}$ (see, e.g., FIGS. 4 and 6) between the inwardly-facing surface 32 of the substrate layer 28 and a bottom-most surface 56 (see, e.g., FIGS. 4 and 6) of each secondary channel 54a, 54b, 54c, 54d of the plurality of secondary channels 54 such that a second thickness portion $T_{28-P2}$ (see, e.g., FIG. 6) of the thickness $T_{28}$ of the substrate layer 28 is not removed by the tool 175.

As seen at FIGS. 4 and 6, in some configurations, the first secondary channel 54a of the plurality of secondary channels 54 may be defined by the substrate layer 28 as follows. The first secondary channel 54a may extend into the thickness $T_{28}$ of the substrate layer 28 at the secondary channel depth $D_{54}$ such that the first secondary channel 54a extends across a portion of the arcuate width $W_{52a}$ of the first wall segment 52a as defined by: (1) some of the male portion 50' of the first side surface portion 46'; (2) a segment of the first side surface portion 46' extending from the inwardly-facing surface 32; (3) all of the inwardly-facing surface 32; (4) a segment of the first primary channel surface portion 44 extending from the inwardly-facing surface 32; and (5) some of the female recess 48 of the first primary channel surface portion 44.

As seen at FIGS. 4 and 6, in some configurations, the second secondary channel 54b of the plurality of secondary channels 54 may be defined by the substrate layer 28 as follows. The second secondary channel 54b may extend into the thickness $T_{28}$ of the substrate layer 28 at the secondary channel depth $D_{54}$ such that the second secondary channel 54b extends across a portion of the arcuate width $W_{52b}$ of the second wall segment 52b as defined by: (1) some of the male portion 50 of second primary channel surface portion 46; (2) a segment of the second primary channel surface portion 46 extending from the inwardly-facing surface 32; (3) all of the inwardly-facing surface 32; (4) a segment of the first primary channel surface portion 44 extending from the inwardly-facing surface 32; and (5) some of the female recess 48 of the first primary channel surface portion 44.

With reference to FIG. 5 and also as seen at FIGS. 4 and 6, in some configurations, the third secondary channel 54c of the plurality of secondary channels 54 may be defined by the substrate layer 28 as follows. The third secondary channel 54c may extend into the thickness $T_{28}$ of the substrate layer 28 at the secondary channel depth $D_{54}$ such that the third secondary channel 54c extends across a portion of the arcuate width $W_{52c}$ of the third wall segment 52c as defined by: (1) some of the male portion 50 of second primary channel surface portion 46; (2) a segment of the second primary channel surface portion 46 extending from the inwardly-facing surface 32; (3) all of the inwardly-facing surface 32; (4) a segment of the second side surface portion 44' extending from the inwardly-facing surface 32; and (5) some of the female recess 48 of the second side surface portion 44'.

As seen at FIGS. 4 and 6, in some configurations, the fourth secondary channel 54d of the plurality of secondary channels 54 may be defined by the substrate layer 28 as follows. The fourth secondary channel 54d may extend into the thickness $T_{28}$ of the substrate layer 28 at the secondary channel depth $D_{54}$ such that the fourth secondary channel 54d extends across a portion of the arcuate width $W_{52d}$ of the fourth wall segment 52d as defined by: (1) some of the male portion 50 of second primary channel surface portion 46; (2) a segment of the second primary channel surface portion 46 extending from the inwardly-facing surface 32; (3) all of the inwardly-facing surface 32; (4) a segment of the first primary channel surface portion 44 extending from the inwardly-facing surface 32; and (5) some of the female recess 48' of the first primary channel surface portion 44.

Figure 13:
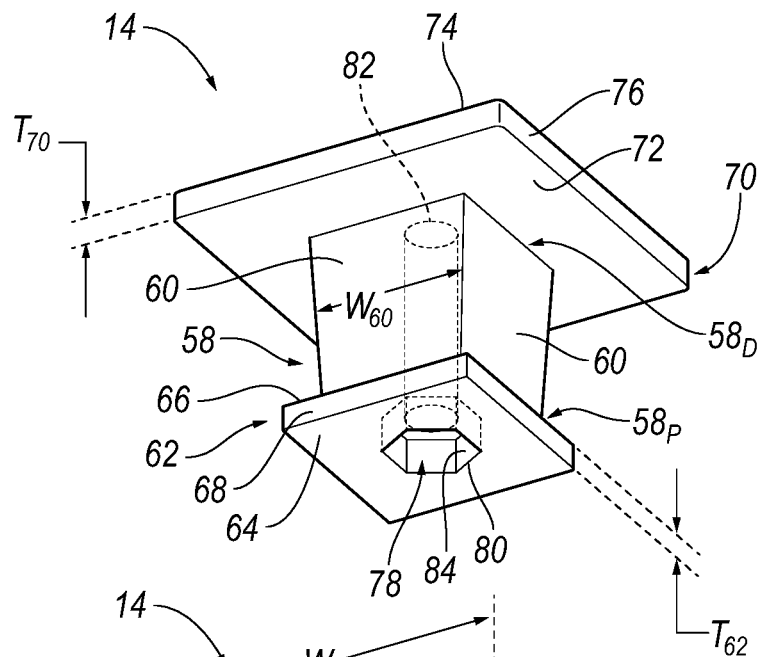
FIG. 13 is a bottom perspective view of a first cap member of the assembly of FIGS. 1-3.
Figure 14:
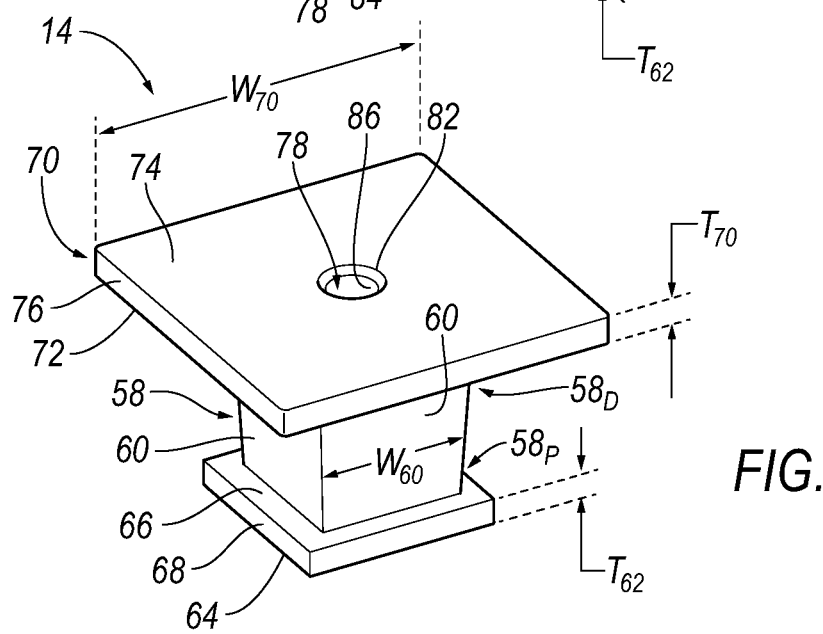
FIG. 14 is a top perspective view of the first cap member of FIG. 13.

Referring now to FIGS. 1, 13, and 14, an exemplary configuration of the first cap member is shown generally at 14. As seen at FIGS. 13 and 14, the first cap member 14 includes a body 58 having a proximal end $58_P$ and a distal end $58_D$. The body 58 is defined by a length $L_{58}$ (see, e.g., FIGS. 3 and 16) extending between the proximal end $58_P$ and the distal end $58_D$. The body 58 may be generally defined by a tapering cuboidal shape having four side surfaces 60 with each side surface having a tapering width $W_{60}$.

The tapering width $W_{60}$ of each side surface 60 narrows or tapers (in a substantially similar manner as described above with respect to each arcuate width $W_{52a}$, $W_{52b}$, $W_{52c}$, $W_{52d}$ of each wall segment 52a, 52b, 52c, 52d of the plurality of wall segments 52) as each side surface 60 extends along the length $L_{58}$ from the distal end $58_D$ toward the proximal end $58_P$.

The first cap member 14 may also include a flange 62 connected to the proximal end $58_P$ of the body 58. The flange 62 is generally defined by a proximal surface 64, a distal surface 66, and a side surface 68 joining the proximal surface 64 to the distal surface 66. The side surface 68 of the flange 62 may include four surface portions that defines the flange 62 to have a substantially square shape. The flange 62 may be further defined by a thickness $T_{62}$ extending between the proximal surface 64 and the distal surface 66. Furthermore, the distal surface 66 may extend substantially orthogonally away from each side surface 60 of the body 58 such that each the side surface 68 of the flange 62 is respectively arranged at a distance $D_{68}$ (see, e.g., FIG. 16) away from each side surface 60 of the body 58.

The first cap member 14 may also include a lip portion 70 connected to the distal end $58_D$ of the body 58. The lip portion 70 is generally defined by a proximal surface 72, a distal surface 74, and a side surface 76 joining the proximal surface 72 to the distal surface 74. The side surface 76 of the lip portion 70 may include four surface portions that defines the lip portion 70 to have a substantially square shape. The lip portion 70 may be further defined by a thickness $T_{70}$ extending between the proximal surface 72 and the distal surface 74. Furthermore, the proximal surface 72 may extend substantially orthogonally away from each side surface 60 of the body 58 such that each the side surface 76 of the lip portion 70 is respectively arranged at a distance $D_{76}$ (see, e.g., FIG. 16) away from each side surface 60 of the body 58.

The cap member 14 may be defined by a length $L_{14}$ (see, e.g., FIG. 16). The length $L_{14}$ of the cap member 14 may be collectively defined by: (1) the thickness $T_{62}$ of the flange 62; (2) the length $L_{58}$ of the body 58; and (3) the thickness $T_{70}$ of the lip portion 70. Furthermore, the cap member 14 may also include an axially-extending fastener-receiving passage 78 that extends through the length $L_{14}$ of the cap member 14.

The axially-extending fastener-receiving passage 78 may be accessible by: (1) a first opening 80 (see, e.g., FIGS. 13 and 16) formed by the proximal surface 64 of the flange 62; and (2) a second opening 82 (see, e.g., FIGS. 13, 14, and 16) formed by the distal surface 74 of the lip portion 70. Furthermore, as seen at FIG. 16, the axially-extending fastener-receiving passage 78 may be defined by: (1) a first surface portion 84 extending from the proximal surface 64 of the flange 62; (2) a second surface portion 86 extending from the distal surface 74 of the lip portion 70; and (3) a shoulder surface portion 88 that is orthogonal to both of and connects the first surface portion 84 to the second surface portion 86.

As seen at FIG. 13, the first surface portion 84 may include a plurality of (e.g., six) surface segments that defines a first portion 78a (see, e.g., FIG. 16) of the axially-extending fastener-receiving passage 78 to have a hexagon shape. The second surface portion 86 may define a second portion 78b (see, e.g., FIG. 16) of the axially-extending fastener-receiving passage 78 to have a circular shape defined by a diameter.

Figure 15:
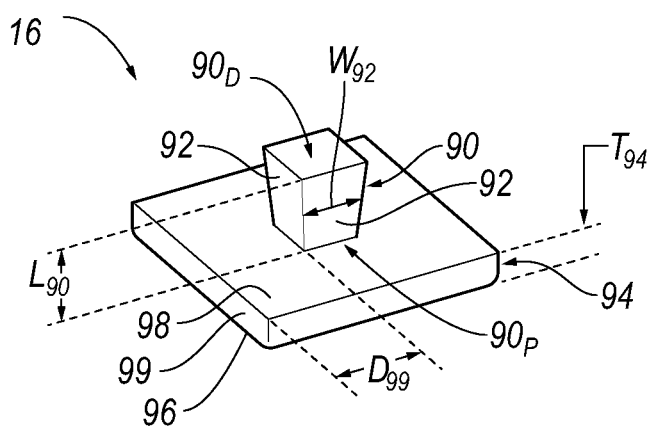
FIG. 15 is a top perspective view of a second cap member of the assembly of FIGS. 1-3.

Referring now to FIGS. 1 and 15, an exemplary configuration of the optional second cap member is shown generally at 16. As seen at FIG. 15, the second cap member 16 includes a body 90 having a proximal end $90_P$ and a distal end $90_D$. The body 90 is defined by a length $L_{90}$ (see also, e.g., FIG. 3) extending between the proximal end $90_P$ of the body 90 and the distal end $90_D$ of the body 90. The body 90 may be generally defined by a tapering cuboidal shape having four side surfaces 92 with each side surface having a tapering width $W_{92}$. The tapering width $W_{92}$ of each side surface 92 narrows or tapers (in a substantially similar manner as described above with respect to the tapering arcuate width $W_{32}$ of each the inwardly-facing surface 32 of each arcuate width $W_{52a}$, $W_{52b}$, $W_{52c}$, $W_{52d}$ of each wall segment 52a, 52b, 52c, 52d of the plurality of wall segments 52) as each side surface 92 extends along the length $L_{90}$ from the distal end $90_D$ toward the proximal end $90_P$.

The second cap member 16 may also include a lip portion 94 connected to the proximal end 90p of the body 90. The lip portion 94 is generally defined by a proximal surface 96, a distal surface 98, and a side surface 99 joining the proximal surface 96 to the distal surface 98. The side surface 99 of the lip portion 94 may include four surface portions that defines the lip portion 94 to have a substantially square shape. The lip portion 94 may be further defined by a thickness $T_{94}$ extending between the proximal surface 96 and the distal surface 98. Furthermore, the distal surface 98 may extend substantially orthogonally away from each side surface 92 of the body 90 such that each the side surface 99 of the lip portion 94 is respectively arranged at a distance $D_{99}$ away from each side surface 92 of the body 90.

Referring to FIGS. 16-18, prior to assembling the assembly 10 at FIGS. 19A-19D by transitioning the pillar member 12 from the first state (see, e.g., FIG. 19A) to the second state (see, e.g., FIG. 19D), a sub-assembly 100 (see, e.g., FIGS. 16 and 18 that includes the first cap 14 and the fastener 18) may be formed in a preliminary assembling step. As seen at FIG. 16, the sub-assembly 100 is formed by firstly axially-aligning and arranging the distal end $18_D$ of the fastener 18 opposite the first opening 80 formed by the proximal surface 64 of the flange 62 of the first cap 14. The male portion 18a of the fastener 18 is then axially passed through the first opening 80 according to the direction of the arrow X such that the distal end $18_D$ of the fastener 18 subsequently axially passes through the second opening 82 formed by the distal surface 74 of the lip portion 70 of the first cap 14 whereby the distal length portion $L_{18a-D}$ of the male portion 18a of the fastener 18 is configured to axially extend beyond the distal surface 74 of the lip portion 70 of the first cap 14 as seen at FIGS. 2 and 3.

With reference to FIGS. 16 and 18, axial insertion of the fastener 18 according to the direction of the arrow X ceases when a distal shoulder surface $18b_D$ (see, e.g., FIG. 16) of the head portion 18b of the fastener 18 is disposed adjacent the shoulder surface portion 88 that partially defines the first portion 78a of the axially-extending fastener-receiving passage 78 of the first cap 14. In some configurations, the fastener 18 may be retained within the axially-extending fastener-receiving passage 78 of the first cap 14 as a result of, for example, an interference-fit connection. As seen at FIG. 17, each first surface portion 84 that defines the first portion 78a of the axially-extending fastener-receiving passage 78 may be defined to include, for example, a dimpled surface, an arcuate surface, or a radially-inwardly-projecting surface (relative to a central axis $A_{14}$-$A_{14}$ extending through the axially-extending fastener-receiving passage 78 of the first cap 14) that defines a passage width $W_{78a}$ of the first portion 78a of the axially-extending fastener-receiving passage 78. The passage width $W_{78a}$ of the first portion 78a of the axially-extending fastener-receiving passage 78 may be approximately the same as but smaller than a width $W_{18b}$ (see, e.g., FIG. 16) of the head portion 18b of the fastener 18. Accordingly, as seen at FIG. 18, when the head portion 18b of the fastener 18 is arranged within the first portion 78a of the axially-extending fastener-receiving passage 78, side surface portions $18b_S$ of the head portion 18b of the fastener 18 come into contact with the dimpled surface, the arcuate surface, or the radially-inwardly-projecting surface 84 that defines the first portion 78a of the axially-extending fastener-receiving passage 78 such that the radially-inwardly projecting material defining each first surface portion 84 is deformed in a radially-outward direction relative to the central axis $A_{14}$-$A_{14}$, which results in each (formerly dimpled/arcuate/radially-inwardly-projecting) surface portion 84 radially engaging and frictionally retaining the head portion 18b of the fastener 18 within the first portion 78a of the axially-extending fastener-receiving passage 78.

Although a frictional engagement of the head portion 18b of the fastener 18 within the first portion 78a of the axially-extending fastener-receiving passage 78 is described above, one or both of the head portion 18b of the fastener 18 and the first portion 78a of the axially-extending fastener-receiving passage 78 may include, for example, an adhesive that adhesively joins the head portion 18b of the fastener 18 within the first portion 78a of the axially-extending fastener-receiving passage 78. In other configurations, the first cap 14 may be formed so as to not include the axially-extending fastener-receiving passage 78, but, rather, integrally include the distal length portion $L_{18a-D}$ of the male portion 18a of the fastener 18 extending beyond the distal surface 74 of the lip portion 70 of the first cap 14. In other configurations, the first cap 14 may be over-molded upon and substantially encapsulate the fastener 18 except for the distal length portion $L_{18a-D}$ of the male portion 18a of the fastener 18 that extends beyond the distal surface 74 of the lip portion 70 of the first cap 14.

Referring to FIGS. 19A-19D, an exemplary method for assembling the assembly 10 is now described. Firstly, as seen at FIG. 19A, the pillar member 12 is arranged in the first state. As also seen at FIG. 19A, the first cap member 14 may be arranged upon, proximate, at, or about the distal end $12_D$ of the pillar member 12, and the optional second cap member 16 may be arranged upon, proximate, at, or about the proximal end $12_P$ of the pillar member 12.

With reference to FIG. 19A, the first cap 14 is arranged upon, proximate, at, or about the distal end $12_D$ of the pillar member 12 such that: (1) a portion of the proximal surface 72 of the lip portion 70 of the first cap 14 is disposed adjacent or opposite the distal end $12_D$ of the pillar member 12; and (2) a portion of the flange 62 of the first cap 14 is registered within, disposed within, or mated with one secondary channel (see, e.g., the third secondary channel 54c) of the plurality of secondary channels 54 of the pillar member 12. As seen at FIG. 19A, the portion of the flange 62 of the first cap 14 may be registered within, disposed within, or mated with the third secondary channel 54c that extends across the third wall segment 52c of the pillar member 12.

The thickness $T_{62}$ (as seen at, e.g., FIGS. 13, 14, and 16-18) of the flange 62 of the first cap 14 may be approximately equal to but less than the lengthwise dimension $L_{54}$ (see, e.g., FIGS. 4 and 5) of each secondary channel 54a, 54b, 54c, 54d of the plurality of secondary channels 54 of the pillar member 12. Furthermore, the distance $D_{68}$ (see, e.g., FIG. 16) at which each the side surface 68 of the flange 62 extends away from each side surface 60 of the body 58 of the first cap 14 may be approximately equal to but less than the secondary channel depth $D_{54}$ (see, e.g., FIGS. 3-5) of each secondary channel 54a, 54b, 54c, 54d of the plurality of secondary channels 54 of the pillar member 12.

Accordingly, as seen at FIGS. 3 and 19A, in view of: (1) the arrangement of the portion of the proximal surface 72 of the lip portion 70 of the first cap 14 being disposed adjacent or opposite the distal end $12_D$ of the pillar member 12; and (2) the exemplary mating configuration of the flange 62 of the first cap 14 with respect to the third secondary channel 54c that extends across the third wall segment 52c of the pillar member 12, one of the side surfaces 60 of the body 58 of the first cap 14 may be arranged adjacent or opposite the inwardly-facing surface 32 of the third wall segment 52c of the pillar member 12. As a result of the registration of the portion of the flange 62 within the third secondary channel 54c, the first cap 14 is prohibited from axially shifting toward or away from each of the distal end $12_D$ of the pillar member 12 of the proximal end $12_P$ of the pillar member 12. Furthermore, the tapering width $W_{60}$ and the length $L_{58}$ of the first cap 14 may be configured to have a similar shape (see, e.g., at FIG. 4 the tapering arcuate width $W_{32}$ extending along the lengthwise distance $L_{12-D}$ from the distal end $12_D$ of the pillar member 12) with respect to, for example, the inwardly-facing surface 32 of the third wall segment 52c of the pillar member 12.

With continued reference to FIG. 19A, in some configurations, a width (see, e.g., width $W_{70}$ at FIG. 14) of lip portion 70 of the first cap 14 extending between opposite side surfaces 76 of the lip portion 70 may be approximately equal to each arcuate width $W_{52a}$, $W_{52b}$, $W_{52c}$, $W_{52d}$ of each wall segment 52a, 52b, 52c, 52d of the plurality of wall segments 52 at the distal end $12_D$ of the pillar member 12.

Furthermore, the distance $D_{76}$ (see, e.g., FIG. 16) at which each the side surface 76 of the lip portion 70 extends away from each side surface 60 of the body 58 of the first cap 14 may be approximately equal to: (1) the thickness $T_{28}$ of the substrate layer 28 (that extends between the inwardly-facing surface 32 of the substrate layer 28 and the outwardly-facing, skin-engaging surface 34 of the substrate layer 28 at FIG. 6) alone; or (2) a combination of the thickness $T_{28}$ of the substrate layer 28 (that extends between the inwardly-facing surface 32 of the substrate layer 28 and the outwardly-facing, skin-engaging surface 34 of the substrate layer 28 at FIG. 6) and the thickness $T_{30}$ of the skin layer 30. Accordingly, as seen at FIG. 3, the side surface 76 of the lip portion 70 may be, for example, aligned with the outwardly-facing surface 38 of the skin layer 30 as a result of the registration of the portion of the flange 62 within the third secondary channel 54c.

With further reference to FIG. 19A, the second cap 16 is arranged upon, proximate, at, or about the proximal end $12_P$ of the pillar member 12 such that such that a portion of the distal surface 98 of the lip portion 94 of the second cap 16 is disposed adjacent or opposite the proximal end $12_P$ of the pillar member 12. As a result of arranging the portion of the distal surface 98 of the lip portion 94 of the second cap 16 adjacent or opposite the proximal end $12_P$ of the pillar member 12, the second cap 16 is prevented from axially shifting in a direction toward the distal end $12_D$ of the pillar member 12.

Furthermore, upon arranging the distal surface 98 of the lip portion 94 of the second cap 16 relative to the proximal end $12_P$ of the pillar member 12, one of the side surfaces 92 of the body 90 of the second cap 16 may be arranged adjacent or opposite the inwardly-facing surface 32 of the third wall segment 52c of the pillar member 12. The tapering width $W_{92}$ (see, e.g., FIG. 15) and the length $L_{90}$ (see, e.g., FIG. 15) of the side surface 92 of the body 90 of the second cap 16 may be configured to have a similar shape with respect to, for example, the inwardly-facing surface 32 of the third wall segment 52c of the pillar member 12 extending away from the proximal end $12_P$ of the pillar member 12 (see, e.g., at FIG. 3, the tapering arcuate width $W_{32}$ of the inwardly-facing surface 32 extending along a lengthwise distance $L_{12-P}$ away from the proximal end $12_P$ of the pillar member 12).

As seen at FIG. 19A, once the first cap 14 and the second cap 16 are arranged relative to the pillar member 12 as described above, one of the wall segments (see, e.g., the fourth wall segment 52d) of the plurality of wall segments 52 of the pillar member 12 is pivoted according to the direction of the arrow W1 for transitioning (e.g., "wrapping" or "rolling") the pillar member 12 from the first state (of FIG. 19A) to the intermediate state (of FIG. 19B). As comparatively seen at FIGS. 19A and 19B, the fourth wall segment 52d is rotated, rolled, or wrapped W1 in a counter-clockwise direction relative the third wall segment 52c as a result of a living hinge connection of the third wall segment 52c to the fourth wall segment 52d generally defined by the third plane $P_{40c}$ (as seen at FIG. 6) extending across the third primary channel 40c. With reference back to FIG. 7, material of the pillar member 12 extending across the third plane $P_{40c}$ that defines the living hinge connection for rotatably-joining the third wall segment 52c to the fourth wall segment 52d may include: (1) at least the first thickness portion $T_{28-P1}$ of the thickness $T_{28}$ of the substrate layer 28; and (2) if included, the thickness $T_{30}$ of the skin layer 30.

Then, as seen at FIG. 19B, in a substantially similar manner as described above with respect to the registration of the portion of the flange 62 of the first cap 14 within the third secondary channel 54c of the third wall segment 52c of the pillar member 12, another portion of the flange 62 of the first cap 14 is registered within the fourth secondary channel 54d of the fourth wall segment 52d of the pillar member 12. The fourth secondary channel 54d of the fourth wall segment 52d (that also defines the fourth secondary channel 54d) of the pillar member 12 is similar in shape and size as that of the third wall segment 52c (that also defines the third secondary channel 54c) of the pillar member 12. As such, the first cap 14 is configured for mating with or being arranged opposite or adjacent the fourth wall segment 52d of the pillar member 12 in a substantially similar manner as that of the third wall segment 52c of the pillar member 12 as described above. Furthermore, the arrangement of surface portions of the second cap 16 with respect to the third wall segment 52c of the pillar member 12 as described above are similarly applied to surface portions of the fourth wall segment 52d of the pillar member 12 as a result of the fourth wall segment 52d being rotated, rolled, or wrapped W1 in a counter-clockwise direction relative the third wall segment 52c.

As seen at FIG. 19B, after the fourth wall segment 52d is rotated, rolled, or wrapped W1 in a counter-clockwise direction relative the third wall segment 52c, the third wall segment 52c is pivoted according to the direction of the arrow W2 for further transitioning (e.g., "wrapping" or "rolling") the pillar member 12 from the intermediate state of FIG. 19B to a further intermediate state as seen at FIG. 19C. As comparatively seen at FIGS. 19B and 19C, the third wall segment 52c is rotated, rolled, or wrapped W2 in a counter-clockwise direction relative the second wall segment 52b as a result of a living hinge connection of the second wall segment 52b to the third wall segment 52c generally defined by the second plane $P_{40b}$ (as seen at FIG. 6) extending across the second primary channel 40b, As similarly referenced at FIG. 7, material of the pillar member 12 extending across the second plane $P_{40b}$ that defines the living hinge connection for rotatably-joining the second wall segment 52b to the third wall segment 52c may include: (1) at least the first thickness portion $T_{28-P1}$ of the thickness $T_{28}$ of the substrate layer 28; and (2) if included, the thickness $T_{30}$ of the skin layer 30. Furthermore, because the third wall segment 52c is connected to the fourth wall segment 52d by a living hinge connection, the rotation W2 of the third wall segment 52c relative the second wall segment 52b also results in the fourth wall segment 52d being carried by and rotated W2 with the third wall segment 52c.

Then, as seen at FIG. 19C, in a substantially similar manner as described above with respect to the registration of the portion of the flange 62 of the first cap 14 within the third secondary channel 54c of the third wall segment 52c of the pillar member 12, another portion of the flange 62 of the first cap 14 is registered within the second secondary channel 54b of the second wall segment 52b of the pillar member 12. The second secondary channel 54b of the second wall segment 52b (that also defines the second secondary channel 54b) of the pillar member 12 is similar in shape and size as that of the third wall segment 52c (that also defines the third secondary channel 54c) of the pillar member 12. As such, the first cap 14 is configured for mating with or being arranged opposite or adjacent the second wall segment 52b of the pillar member 12 in a substantially similar manner as that of the third wall segment 52c of the pillar member 12 as described above. Furthermore, the arrangement of surface portions of the second cap 16 with respect to the third wall segment 52c of the pillar member 12 as described above are similarly applied to surface portions of the second wall segment 52b of the pillar member 12 as a result of the third wall segment 52c being rotated, rolled, or wrapped W2 in a counter-clockwise direction relative the second wall segment 52b.

As seen at FIG. 19C, after the third wall segment 52c is rotated, rolled, or wrapped W2 in a counter-clockwise direction relative the second wall segment 52b, the second wall segment 52b may be pivoted according to the direction of the arrow W3 (in a counter-clockwise direction) relative the first wall segment 52a for further transitioning (e.g., "wrapping" or "rolling") the pillar member 12 from the further intermediate state of FIG. 19C to the second state as seen at FIG. 19D. Alternatively, as seen at FIG. 19C, the first wall segment 52a may be pivoted according to the direction of the arrow W3' (in a clockwise direction) relative the second wall segment 52b for further transitioning (e.g., "wrapping" or "rolling") the pillar member 12 from the further intermediate state of FIG. 19C to the second state as seen at FIG. 19D.

As comparatively seen at FIGS. 19C and 19D, manipulation of either of the first wall segment 52a or the second wall segment 52b according to the direction of the arrows W3 or W3', arises from a living hinge connection of the first wall segment 52a to the second wall segment 52b that is generally defined by the first plane $P_{40a}$ (as seen at FIG. 6) extending across the first primary channel 40a. As similarly referenced at FIG. 7, material of the pillar member 12 extending across the first plane $P_{40a}$ that defines the living hinge connection for rotatably-joining the first wall segment 52a to the second wall segment 52b may include: (1) at least the first thickness portion $T_{28-P1}$ of the thickness $T_{28}$ of the substrate layer 28; and (2) if included, the thickness $T_{30}$ of the skin layer 30. Furthermore, because: (1) the second wall segment 52b is connected to the third wall segment 52c by a living hinge connection; and (2) the third wall segment 52c is connected to the fourth wall segment 52d by a living hinge connection, the rotation W3 of the second wall segment 52b relative the first wall segment 52a also results in the third wall segment 52c and the fourth wall segment 52d being carried by and rotated W1 with the second wall segment 52b.

With reference to FIGS. 19C and 19D, in a substantially similar manner as described above with respect to the registration of the portion of the flange 62 of the first cap 14 within the third secondary channel 54c of the third wall segment 52c of the pillar member 12, another portion of the flange 62 of the first cap 14 is registered within the first secondary channel 54a of the first wall segment 52a of the pillar member 12. The first secondary channel 54a of the first wall segment 52a (that also defines the first secondary channel 54a) of the pillar member 12 is similar in shape and size as that of the third wall segment 52c (that also defines the third secondary channel 54c) of the pillar member 12. As such, the first cap 14 is configured for mating with or being arranged opposite or adjacent the first wall segment 52a of the pillar member 12 in a substantially similar manner as that of the third wall segment 52c of the pillar member 12 as described above. Furthermore, the arrangement of surface portions of the second cap 16 with respect to the third wall segment 52c of the pillar member 12 as described above are similarly applied to surface portions of the first wall segment 52a of the pillar member 12 as a result of, for example, the second wall segment 52b being rotated, rolled, or wrapped W3 in a counter-clockwise direction relative the first wall segment 52a, or, alternatively, the first wall segment 52a being rotated, rolled, or wrapped W3' in a clockwise direction relative the second wall segment 52b.

Although an exemplary method for assembling the assembly 10 is described at FIGS. 19A-19D, the methodology is not limited to what is shown and described therein. For example, although the first cap 14 and the second cap 16 are shown initially arranged upon the third wall segment 52c of the pillar member 12 at FIG. 19A, one or both of the first cap 14 and the second cap 16 may be arranged upon any or different wall segments 52a, 52b, 52c, 52d of the plurality of wall segments 52. Furthermore, another assembling step may include conducting, for example, one or both of the rotating, rolling, or wrapping steps (according to the direction of arrows W1, W2) and then arranging one or both of the first cap 14 and the second cap 16 upon any wall segment 52a, 52b, 52c, 52d of the plurality of wall segments 52. Yet even further, although the rotating, rolling, or wrapping steps (according to the direction of arrows W1, W2, W3) are shown in a sequence at FIGS. 19A, 19B, and 19C, respectively, the rotating, rolling, or wrapping steps W1, W2, W3/W3' may be conducted in any sequence, and, furthermore, although the direction of the arrows W1, W2 are shown in a counter-clockwise direction, the direction of the arrows W1, W2 may also occur in an opposite, clockwise direction (in a substantially manner as that according to the direction of the arrow W3').

Also, although the plurality of wall segments 52, the first cap 14, and the second cap 16 are shown and described to include four surface portions (see, e.g.: four surface portions 60, 68, 76 of the first cap 14; four surface portions 92, 99 of the second cap 16; and four wall segments 52a, 52b, 52c, 52d) resulting in the pillar member 12, the first cap 14, and the second cap 16 having a substantially cuboidal shape, the pillar member 12 may be defined by any desirable number (e.g., three, four, five, six, or more) of surface portions. Accordingly, the first cap 14, and the second cap 16 may be similarly shaped to have any desirable number of surface portions that are equivalent to the number of wall segments of the plurality of wall segments 52 such that when the plurality of wall segments 52 are rotated, rolled, or wrapped relative the first cap 14 and the second cap 16, one or both of the first cap 14 and the second cap 16 may be non-removably-connected to the pillar member 12.

With reference to FIGS. 3 and 19D, once the pillar member 12 is arranged in the second state, the inwardly-facing surface 32 of each wall segment 52a, 52b, 52c, 52d of the plurality of wall segments 52 cooperate to form the tapering cavity 20, which tapers or narrows as the tapering cavity 20 extends from the distal end $12_D$ of the pillar member 12 to the proximal end $12_P$ of the pillar member 12. Furthermore, when arranged in the second state, the inwardly-facing surface 32 of each wall segment 52a, 52b, 52c, 52d of the plurality of wall segments 52 that extend from the distal end $12_D$ of the pillar member 12 cooperate to form the distal opening 24 (see, e.g., FIGS. 3, 8, and 10) of the pillar member 12. Yet even further, when arranged in the second state, the inwardly-facing surface 32 of each wall segment 52a, 52b, 52c, 52d of the plurality of wall segments 52 that extend from the proximal end $12_P$ of the pillar member 12 cooperate to form the proximal opening 22 (see, e.g., FIGS. 3, 9, and 12) of the pillar member 12.

Furthermore, as seen at FIGS. 8-10, and 12 (and corresponding to FIGS. 19A-19C), the male portions 50 that extend away from the second primary channel surface portion 46 that respectively partially defines each primary channel 40a, 40b, 40c of the plurality of primary channels 40 of the pillar member 12 are registered within corresponding the female recesses 48 that extend into the first primary channel surface portion 44 that respectively partially defines each primary channel 40a, 40b, 40c of the plurality of primary channels 40 of the pillar member 12. Yet even further, as seen at FIGS. 8-10, and 12 (and corresponding to FIG. 19D), the male portion 50' that extends away from the first side surface portion 46' that partially defines the first end $12_{E1}$ of the pillar member 12 is registered within the female recess 48' that extends into the second side surface portion 44' that partially defines the second end $12_{E2}$ of the pillar member 12.

With reference to FIG. 6, in some instances, an adhesive A may be applied (e.g., sprayed) from an applicator (e.g., a spray gun G) to one or more surface portions of the substrate layer 28 and/or the skin layer 30. For example, the adhesive A may be applied upon one or more of: (1) a first side surface defining the thickness $T_{30}$ of the skin layer 30 that partially defines the first end $12_{E1}$ of the pillar member 12; (2) the first side surface portion 46' of the substrate layer 28 of the first wall segment 52a; (3) the male portion 50' that extends away from the first side surface portion 46' of the substrate layer 28 of the first wall segment 52a; (4) one, some, or all of the inwardly-facing surface(s) 32 of the substrate layer 28 of the wall segments 52a, 52b, 52c, 52d of the plurality of wall segments 52; (5) the first primary channel surface portion 44 of the substrate layer 28 of one or more of the wall segments 52a, 52b, 52c of the plurality of wall segments 52; (6) the female portion 48 that extends into the first primary channel surface portion 44 of the substrate layer 28 of one or more of the wall segments 52a, 52b, 52c of the plurality of wall segments 52; (7) the second primary channel surface portion 46 of the substrate layer 28 of one or more of the wall segments 52b, 52c, 52d of the plurality of wall segments 52; (8) the male portion 50 that extends away from the second primary channel surface portion 46 of the substrate layer 28 of one or more of the wall segments 52b, 52c, 52d of the plurality of wall segments 52; (9) the second side surface portion 44' of the substrate layer 28 of the fourth wall segment 52d; (10) the female portion 48' that extends into the second side surface portion 44' of the substrate layer 28 of the fourth wall segment 52d; (11) a second side surface defining the thickness $T_{30}$ of the skin layer 30 that partially defines the second end $12_{E2}$ of the pillar member 12; and (12) any of the surfaces such as, for example, the bottom-most surface 56, defining any of the secondary channels 54a, 54b, 54c, 54d of the plurality of secondary channels 54. Accordingly, after transitioning the pillar member 12 from the first state to the intermediate states as seen at FIGS. 19A-19C, the adhesive A may adhesively secure neighboring or adjacent wall segments of the plurality of wall segments 52 together such as, for example: (1) a first pair of neighboring or adjacent wall segments defined by the first wall segment 52a and the second wall segment 52b; (2) the second wall segment 52b and the third wall segment 52c; and (3) the third wall segment 52c and the fourth wall segment 52d. Furthermore, after transitioning the pillar member 12 from the further intermediate state to the second state as seen at FIG. 19D, the adhesive A may adhesively secure terminal end wall segments or opposite end wall segments of the plurality of wall segments 52 together such as, for example: the first wall segment 52a and the fourth wall segment 52d.

With further reference to FIGS. 3 and 19D, after the first cap 14 is arranged upon the pillar member 12, and, after the pillar member 12 is subsequently transitioned from the first state to the second state, the portions of flange 62 of the first cap 14 are registered within, respectively, each secondary channel 54a, 54b, 54c, 54d of the plurality of secondary channels 54 of the pillar member 12. Accordingly, the flange 62 is axially contained within the tapering cavity 20 of the pillar member 12 that ultimately results in the first cap 14 being non-removably-connected to the pillar member 12 such that the body 58 of the first cap 14 is not permitted to be axially dislodged from within the tapering cavity 20 and out of the distal opening 24. Furthermore, the axial containment of the flange 62 and the body 58 of the first cap 14 within the tapering cavity 20 also results in the proximal surface 72 of the lip portion 70 of the first cap 14 being retained or maintained adjacent or opposite the distal end $12_D$ of the pillar member 12. As a result of the arrangement of the first cap 14 relative the pillar member 12, the first cap 14 closes out the distal opening 24 of the pillar member 12 and may be configured to be disposed adjacent an underside surface 79 of the article 75 (see, e.g., FIG. 3).

With even further reference to FIGS. 3 and 19D, after the second cap 16 is arranged upon the pillar member 12, and, after the pillar member 12 is subsequently transitioned from the first state to the second state, the body 90 of the second cap 16 is axially contained within the tapering cavity 20 of the pillar member 12. Accordingly, the second cap 16 is non-removably-connected to the pillar member 12 such that the body 90 of the second cap 16 is not permitted to be axially dislodged from within the tapering cavity 20 and out of the proximal opening 22 of the pillar member 12. Axial dislodgement of the body 90 of the second cap 16 out of the proximal opening 22 of the pillar member 12 is prevented as a result of the tapering width $W_{92}$ of each side surface 92 defining the body 90 of the second cap 16 that extends from the distal surface 98 of the lip portion 94 of the second cap 16 being greater than the tapering arcuate width $W_{32}$ of each the inwardly-facing surface 32 of each arcuate width $W_{52a}$, $W_{52b}$, $W_{52c}$, $W_{52d}$ of each wall segment 52a, 52b, 52c, 52d of the plurality of wall segments 52 that defines the proximal opening 22 of the pillar member 12. Furthermore, the axial containment of the body 90 of the second cap 16 within the tapering cavity 20 also results in the distal surface 98 of the lip portion 94 of the second cap 16 being retained or maintained adjacent or opposite the proximal end 12p of the pillar member 12. As a result of the arrangement of the second cap 16 relative the pillar member 12, the second cap 16 closes out the proximal opening 22 of the pillar member 12 and may be configured to be disposed adjacent a floor or support surface S (see, e.g., FIG. 3).

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

What is claimed is:

1. An assembly comprising:
a pillar member having a distal end and a proximal end; and
a cap member axially extending away from the distal end of the pillar member, wherein the pillar member includes a plurality of wall segments, wherein at least one pair of wall segments of the plurality of wall segments are connected by a living hinge, wherein the plurality of wall segments form a cavity that is configured to:
axially receive a first portion of the cap member; and
radially receive a second portion of the cap member for non-removably connecting the cap member to the pillar member.

2. The assembly of claim 1 further comprising:
a fastener that extends away from a distal surface of the cap member.

3. The assembly of claim 2, wherein a fastener-receiving passage extends through the cap member and is accessible by a distal opening formed by the distal surface of the cap member, wherein the fastener is disposed within the fastener-receiving passage such that a distal length portion of a length of the fastener extends beyond the distal surface of the cap member.

4. The assembly of claim 3, wherein the fastener includes:
a head portion; and
a stem portion extending from the head portion,
wherein the head portion is disposed within a head-receiving portion of the fastener-receiving passage, and wherein the stem portion is disposed within a stem-receiving portion of the fastener-receiving passage.

5. The assembly of claim 1 further comprising:
a closure member non-removably connected to the proximal end of the pillar member, wherein a portion of the closure member is configured for axial arrangement within a portion of the cavity that extends from the proximal end of the pillar member.

6. The assembly of claim 5, wherein the portion of the closure member is defined by:
a closure member width dimension that increases along an axial length of the portion of the closure member as the portion of the closure member axially extends from the proximal end of the pillar member toward the distal end of the pillar member.

7. The assembly of claim 6, wherein the cavity is defined by:
a cavity width dimension that decreases along an axial length of the pillar member as the cavity axially extends from the distal end of the pillar member toward the proximal end of the pillar member.

8. The assembly of claim 1, wherein each wall segment of the plurality of wall segments includes a radially-extending channel that is sized for receiving the second portion of the cap member for non-removably connecting the cap member to the pillar member.

9. The assembly of claim 8, wherein the second portion of the cap member includes a flange that radially extends from the first portion of the cap member.

10. The assembly of claim 9, wherein the cap member further includes a lip portion that extends over and is arranged upon the distal end of the pillar member.

11. The assembly of claim 1, wherein each wall segment of the plurality of wall segments is defined by a body:
a length dimension extending between a first end of the body and a second end of the body that is opposite the first end of the body; and
a width dimension extending between a first edge of the body and a second edge of the body that is opposite the first edge of the body,
wherein the width dimension of the body of each wall segment of the plurality of wall segments decreases along the length of the body as the body extends from the first end of the body to the second end of the body.

12. The assembly of claim 11, wherein the body of each wall segment of the plurality of wall segments includes a male portion and a female portion, wherein the male portion of one wall segment is arranged within the female portion of another wall segment.

13. The assembly of claim 12, wherein the body of each wall segment of the plurality of wall segments is defined by:
an outer show surface; and
an inner surface,
wherein the inner surface at least partially defines the cavity.

14. The assembly of claim 13, wherein the inner surface includes:
a first segment of the width dimension of the body of each wall segment of the plurality of wall segments, wherein the first segment of the width dimension includes the male portion;
a second segment of the width dimension of the body of each wall segment of the plurality of wall segments, wherein the second segment of the width dimension includes the female portion; and
a third segment of the width dimension of the body of each wall segment of the plurality of wall segments, wherein the third segment of the width dimension of the body extends between and connects the first segment of the width dimension of the body to the second segment of the width dimension of the body, wherein the third segment of the width dimension of the body at least partially defines the cavity of the pillar member.

15. An assembly comprising:
a pillar member having a distal end and a proximal end, wherein the pillar member includes a plurality of wall segments;
a cap member axially extending away from the distal end of the pillar member;
   wherein at least one pair of wall segments of the plurality of wall segments are connected by a living hinge, wherein the plurality of wall segments define a cavity extending through an axial length of pillar member,
   wherein the cavity is configured to axially receive a first portion of the cap member and radially receive a second portion of the cap member for non-removably-connecting the cap member to the pillar member; and
a closure member having a pillar-engaging portion for non-removably-coupling the closure member to the pillar member,
   wherein the closure member includes a closure member width dimension of the pillar-engaging portion of the closure member that increases along an axial length of the pillar-engaging portion of the closure member as the pillar-engaging portion of the closure member axially extends from the proximal end of the pillar member toward the distal end of the pillar member, and
   wherein the cavity includes a cavity width dimension that decreases along the axial length of pillar member as the cavity axially extends from the distal end of the pillar member toward the proximal end of the pillar member.

16. The assembly of claim 15 further comprising:
a fastener that extends away from a distal surface of the cap member.

17. The assembly of claim 16, wherein a fastener-receiving passage extends through the cap member and is accessible by a distal opening formed by the distal surface of the cap member, wherein the fastener is disposed within the fastener-receiving passage such that a distal length portion of a length of the fastener extends beyond the distal surface of the cap member.

18. The assembly of claim 17, wherein the fastener includes:
a head portion; and
a stem portion extending from the head portion,
   wherein the head portion is disposed within a head-receiving portion of the fastener-receiving passage, and wherein the stem portion is disposed within a stem-receiving portion of the fastener-receiving passage.

19. The assembly of claim 15, wherein each wall segment of the plurality of wall segments includes a radially-extending channel that is sized for receiving the second portion of the cap member for non-removably connecting the cap member to the pillar member.

20. The assembly of claim 19, wherein the second portion of the cap member includes a flange that radially extends from the first portion of the cap member, wherein the first portion of the cap member is a base portion of the cap member.

21. The assembly of claim 20, wherein the cap member further includes a lip portion that extends over and is arranged upon the distal end of the pillar member.

22. A method for assembling the assembly of claim 1 comprising:
providing the pillar member in a first, unwrapped state;
transitioning the pillar member from the first, unwrapped state to an intermediate, partially wrapped state;
further transitioning the pillar member from the intermediate, partially wrapped state to a second, wrapped state; and
arranging the cap member upon the pillar member prior to arranging the pillar member in the second wrapped state for:
disposing the cap member at the distal end of the pillar member, wherein, upon transitioning the pillar member to the second, wrapped state results in:
non-removably connecting the cap member to the pillar member for preventing axial movement of the cap member relative the pillar member.

23. The method of claim 22, wherein a cavity-forming surface of each wall segment of the plurality of wall segments defines the cavity, wherein each cavity-forming surface of each wall segment is defined by a non-constant cavity width dimension that decreases along an axial length of pillar member as the cavity axially extends from the distal end of the pillar member toward the proximal end of the pillar member.

24. The method of claim 23, wherein the arranging the cap member upon the pillar member step further includes:
radially disposing at least one segment of a side surface of a flange portion of the cap member within one or more radially-extending channels of one or more wall segments of the plurality of wall segments of the pillar member.

25. The method of claim 24, wherein the cap member includes a plurality of side surface portions that are defined by a non-constant side surface width that decreases in an axial direction from the distal end of the pillar member toward the proximal end of the pillar member, wherein the non-constant side surface width is approximately the same as but less than the non-constant cavity width dimension.

26. The method of claim 23, wherein each wall segment of the plurality of wall segments is defined by a body, wherein the arranging the cap member upon the pillar member step further includes:
respectively arranging at least one side surface portion of a plurality of side surface portions of the cap member opposite at least one cavity forming surface of a plurality of cavity-forming surfaces of the one or more wall segments of the plurality of wall segments of the pillar member, wherein a proximal end of the body of the wall segment of one of more wall segments of the plurality of wall segments extends axially away from a distal surface of a lip portion of the cap member.

27. The method of claim 26, wherein each side surface portion of the body of the cap member is defined by a non-constant side surface width that increases in an axial direction from the proximal end of the pillar member toward the distal end of the pillar member, wherein the non-constant side surface width is approximately the same as but less than the non-constant cavity width dimension.

28. The method of claim 27, wherein the arranging the cap member upon the pillar member step further includes:
axially arranging at least one portion of the distal surface of the lip portion of the cap member opposite the proximal surface of the pillar member.

* * * * *